US008378020B1

(12) United States Patent
Balakshin et al.

(10) Patent No.: US 8,378,020 B1
(45) Date of Patent: Feb. 19, 2013

(54) PROCESSES FOR RECOVERY OF DERIVATIVES OF NATIVE LIGNIN

(75) Inventors: Mikhail Yurevich Balakshin, North Vancouver (CA); Alex Berlin, Burnaby (CA); Humbert Thomas Dellicolli, Hanahan, SC (US); Chadrick Adam Nathaniel Jordan Grunert, Vancouver (CA); Vera Maximenko Gutman, Burnaby (CA); Darwin Ortiz, Delta (CA); Edward Kendall Pye, Media, PA (US)

(73) Assignee: Lignol Innovations Ltd., Burnaby (CA)

( * ) Notice: Subject to any disclaimer, the term of this patent is extended or adjusted under 35 U.S.C. 154(b) by 0 days.

(21) Appl. No.: 12/789,366

(22) Filed: May 27, 2010

Related U.S. Application Data

(60) Provisional application No. 61/304,751, filed on Feb. 15, 2010, provisional application No. 61/233,345, filed on Aug. 12, 2009, provisional application No. 61/182,044, filed on May 28, 2009.

(51) Int. Cl.
*C08H 7/00* (2011.01)
*C08G 18/63* (2006.01)

(52) U.S. Cl. ...................... 524/735; 524/700

(58) Field of Classification Search ............ 524/735
See application file for complete search history.

(56) References Cited

U.S. PATENT DOCUMENTS

| 4,764,596 | A | * | 8/1988 | Lora et al. | .......... 530/507 |
| 5,196,460 | A | * | 3/1993 | Lora et al. | .......... 524/76 |
| 7,465,791 | B1 | * | 12/2008 | Hallberg et al. | .......... 530/500 |

OTHER PUBLICATIONS

Cateto et al., Journal of Applied Polymer Science, vol. 109, 3008-3017, 2008.*
Gregorova et al., Journal of Applied Polymer Science, vol. 106, 1626-1631, 2007.*
Luo, thesis, Univerisity of Maine, May 2010.*

* cited by examiner

*Primary Examiner* — Hui Chin
(74) *Attorney, Agent, or Firm* — Perkins Coie LLP.; Viola T. Kung

(57) ABSTRACT

The present disclosure relates to processes for recovery of derivatives of native lignin from lignocellulosic feedstocks wherein the derivatives have a certain aliphatic hydroxyl content. Surprisingly, it has been found that stable and predictable antioxidant activity is provided by selecting for derivatives of native lignin having a certain aliphatic hydroxyl content.

6 Claims, 9 Drawing Sheets

PROCESSES FOR RECOVERY OF DERIVATIVES OF NATIVE LIGNIN

CROSS-REFERENCE TO RELATED APPLICATIONS

This application claims the benefit of U.S. Provisional Application No. 61/304,751, filed Feb. 15, 2010, titled "PROCESSES FOR RECOVERY OF DERIVATIVES OF NATIVE LIGNIN," U.S. Provisional Application No. 61/233,345. filed Aug. 12, 2009, titled "NOVEL LIGNIN DERIVATIVES AND METHODS OF GENERATION THEREOF FROM CONIFEROUS BIOMASS FEEDSTOCKS," and U.S. Provisional Application No. 61/182,044, filed May 28, 2009, titled LIGNIN-MODIFIED WAX EMULSIONS, THEIR PREPARATION, AND USES THEREFOR," all of which are incorporated herein by reference in their entireties.

FIELD

This disclosure relates to processes for recovery of derivatives of native lignin from lignocellulosic feedstocks, recovered derivatives of native lignins, and industrial applications thereof. More particularly, this disclosure relates to processes for recovery of derivatives of native lignin having certain chemical properties as well as uses, processes, methods, and compositions thereof.

BACKGROUND

Native lignin is a naturally occurring amorphous complex cross-linked organic macromolecule that comprises an integral structural component of all plant biomass. The chemical structure of lignin is irregular in the sense that different structural units (e.g., phenylpropane units) are not linked to each other in any systematic order. It is known that native lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures i.e. guaiacyl monolignol, syringyl monolignol and p-hydroxyphenyl monolignol, respectively, that are polymerized via specific linkages to form the native lignin macromolecule.

Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e. hardwood lignins, softwood lignins, and annual fiber lignins.

Native lignins are partially depolymerized during chemical pulping processes into lignin fragments which are soluble in the pulping liquors and subsequently separated from the cellulosic pulps. Post-pulping liquors containing lignin and polysaccharide fragments, and other extractives, are commonly referred to as "black liquors" or "spent liquors", depending on the chemical pulping process. Such liquors are generally considered a by-product, and it is common practice to combust them to recover some energy value in addition to recovering the cooking chemicals. However, it is also possible to precipitate and/or recover lignin derivatives from these liquors. Each type of chemical pulping process used to separate cellulosic pulps from other lignocellulosic components produces lignin derivatives that are very different in their physico-chemical, biochemical, and structural properties.

Given that lignin derivatives are available from renewable biomass sources there is an interest in using these derivatives in certain industrial processes. For example, lignin derivatives obtained via organosols extraction, such as the Alcell® process (Alcell is a registered trademark of Lignol Innovations Ltd., Burnaby, BC, CA), have been used in rubber products, friction materials, adhesives, resins, plastics, asphalt, cement, casting resins, agricultural products, and oil-field products. However, large-scale commercial application of the extracted lignin derivatives, particularly those isolated in traditional pulping processes employed in the manufacture of pulp and paper, has been limited due to, for example, the inconsistency of their chemical and functional properties. This inconsistency may, for example, be due to changes in feedstock supplies and the particular extraction/generation/recovery conditions. These issues are further complicated by the complexity of the molecular structures of lignin derivatives produced by the various extraction methods and the difficulty in performing reliable routine analyses of the structural conformity and integrity of recovered lignin derivatives. For instance, lignin derivatives are known to have antioxidant properties (e.g. Catignani G. L., Carter M. E., Antioxidant Properties of Lignin, Journal of Food Science, Volume 47, Issue 5, 1982, p. 1745; Pan X. et al. J. Agric. Food Chem., Vol. 54, No. 16, 2006, pp. 5806-5813) but, to date, these properties have been highly variable making the industrial application of lignin derivatives as an antioxidant problematic.

Thermoplastics and thermosets are used extensively for a wide variety of purposes. Examples of thermoplastics include classes of polyesters, polycarbonates, polylactates, polyvinyls, polystyrenes, polyamides, polyacetates, polyacrylates, polypropylene, and the like. Polyolefins such as polyethylene and polypropylene represent a large market, amounting to more than 100 million metric tons annually worldwide. During manufacturing, processing and use the physical and chemical properties of certain thermoplastics can be adversely affected by various factors such as exposure to heat, UV radiation, light, oxygen, mechanical stress or the presence of impurities. Clearly it is advantageous to mitigate or avoid these problems. In addition, the increase in recycling of material has led to an increased need to address these issues.

Degradation caused by free radicals, exposure to UV radiation, heat, light, and environmental pollutants are frequent causes of the adverse effects. A stabilizer such as an antioxidant, anti-ozonant, or UV block is often included in thermoplastic resins for the purpose of aiding in the production process and extending the useful life of the product. Common examples of stabilizers and antioxidants include amine types, phenolic types, phenol alkanes, phosphites, and the like. These additives often have undesirable or even unacceptable environmental, health and safety, economic, and/or disposal issues associated with their use. Furthermore, certain of these stabilizers/antioxidants can reduce the biodegradability of the product.

It has been suggested that lignin may provide a suitable polymeric natural antioxidant which has a low level of toxicity toxicity, efficacy, and environmental profile. See, for example, A. Gregorova et al., Radical scavenging capacity of lignin and its effect on processing stabilization of virgin and recycled polypropylene, Journal of Applied Polymer Science 106-3 (2007) pp. 1626-1631; C. Pouteau et al. Antioxidant Properties of Lignin in Polypropylene, Polymer Degradation and Stability 81 (2003) 9-18. For a variety of reasons, despite the advantages, lignin has not been adopted for widespread use as an antioxidant. For instance, it is often problematic to provide lignins that perform consistently in terms of antioxidant activity. Also, the processing of the lignin may introduce substances that are incompatible for use with chemicals such as polyolefins. Additionally, the cost of producing and/or purifying the lignin may make it uneconomic for certain uses.

SUMMARY

Some embodiments of the present disclosure relate to derivatives of native lignin having certain aliphatic hydroxyl contents. Surprisingly, it has been found that stable and predictable antioxidant activity is provided by selecting for derivatives of native lignin having certain aliphatic hydroxyl contents. Some embodiments of the present disclosure relate to processes for organosolv pulping of lignocellulosic biomass feedstocks wherein certain operating parameters are selectively manipulated to recover lignin derivatives having certain aliphatic hydroxyl contents.

This summary does not necessarily describe all features of the invention. Other aspects, features and advantages of the invention will be apparent to those of ordinary skill in the art upon review of the following description of specific embodiments of the invention.

BRIEF DESCRIPTION OF THE DRAWINGS

The present disclosure will be described in conjunction with reference to the following drawings, in which.

DETAILED DESCRIPTION

Figure 1:
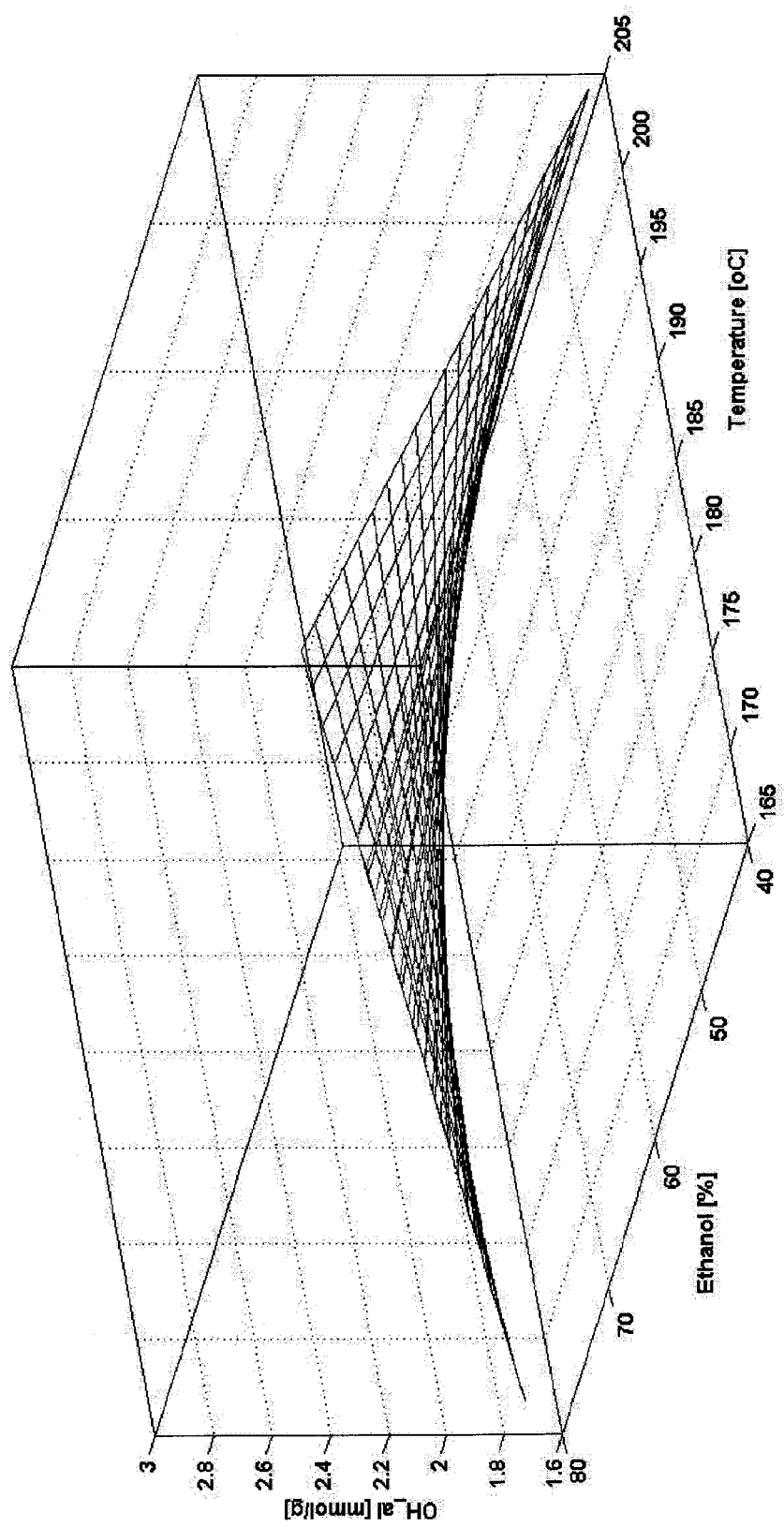
FIG. 1 is a chart showing aliphatic hydroxyl contents of lignin derivatives of the present disclosure recovered from aspen as a function of organic solvent concentration [Ethanol] and pulping temperature [Temperature] at constant pH of 2.47 and pulping time of 68 min.

The present disclosure relates to derivatives of native lignin having certain aliphatic hydroxyl contents, and to organosolv pulping processes tailored for recovery of the lignin derivatives from lignocellulosic biomass feedstocks.

Lignin derivative having lower aliphatic hydroxyl contents have been found to score more highly on the Radical Scavenging Index (RSI), a measure of antioxidant activity. Thus, selecting for derivatives of native lignin having a lower aliphatic hydroxyl content results in a product having a higher and more predictable antioxidant activity. It has been found that derivatives of native lignin having an aliphatic hydroxyl content of about 2.35 mmol/g or less result in a good level of antioxidant activity. For example, about 2.25 mmol/g or less, about 2.00 mmol/g or less, or about 1.75 mmol/g or less.

Radical Scavenging Index (RSI) is a measure of radical scavenging capacity. The assay uses 2,2-diphenyl-1-picryl-hydrazyl (DPPH), a stable free radical which absorbs light strongly at 515 nm to measure a compound's radical scavenging index (RSI). In its radical form, DPPH. absorbs strongly at 515 nm and has a deep purple colour. As DPPH gives up its free electron to radical scavengers, it loses its purple colour and its absorbance shifts to 520 nm. The greater the drop in DPPH absorbance at 515 nm after a test compound has been added to the DPPH solution, the higher the compound's free RSI and also, its antioxidant activity. In the present disclosure, Vitamin E (Vit. E) and butylated hydroxytoluene (BHT) are used as positive controls. The lignin derivative samples (1.0-2.0 mg), Vit. E control samples (1.0-2.0 mg), and BHT control samples (6.0-8.0 mg) are prepared for testing by being placed into microcentrifuge tubes after which, each was diluted with 1.0 mL of 90% (v/v) aqueous dioxane, vortexed, transferred to new microcentrifuge tubes and further diluted 50/50 with 90% aqueous dioxane to give stock concentrations of 0.5-1.0 mg/mL for the samples and Vitamin E and 3.0-4.0 mg/mL for BHT. An indicating (purple) DPPH stable free radical solution is made by dissolving 3.78 mg DPPH in 100 mL 90% dioxane (95.9 μM). Samples and standards are serially diluted to fill columns of a quartz 96-well plate (8 dilutions). The assays were performed by placing aliquots of the sample stock solutions into two rows of wells in a 96-well plate. The first row served as the reference row while the second row received DPPH aliquots. 165 μL of 90% dioxane was added to each well and mixed.

Aliquots of the mixed samples in each row are transferred to the adjacent row which is further diluted with 165 μL of 90% dioxane in each well. The mixing, transferring and dilution are repeated until the last row of wells is prepared. The same volume of aliquots is removed from the last row. The 96-well plate also contains a row of wells that received only the 90% dioxane. In the final step of the preparation procedure, 165 μL of the DPPH solution is added to all the control and analytical columns by using an 8-channel auto-pipette and an Eppendorf reagent reservoir as quickly as possible. As soon as all reagents are added, the plate is placed into a plate-reading spectrophotometer (Molecular Devices, Sunnyvale, Calif., USA, Spectra Max Plus), and absorbance measurements are carried out. The program for the spectrophotometer (SOFTmax software) consists of a timing sequence of 16 min and a reading of the entire plate at 515 nm. RSI is defined as the inverse of the concentration which produces 50% inhibition in DPPH absorbance at 515 nm. The results are then 'normalized' by dividing sample RSI by the RSI value for the BHT control. The normalized RSI is represented by this acronym "NRSI".

The present disclosure provides processes for recovery of derivatives of native lignin during or after organosols pulping of lignocellulosic feedstocks. The pulp may be from any suitable lignocellulosic feedstock including hardwoods, softwoods, annual fibres, and combinations thereof. Hardwood feedstocks include *Acacia*; *Afzelia*; *Synsepalum duloificum*; *Albizia*; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescent*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Dioipyros kurii, Diospyros melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraczflua, Nyssa aquatica*); Hickory (e.g. *Carya alba, Carya glabra, Carya ovata, Carya laciniosa*); Hornbeam; Hophornbeam; Ipê; Iroko; Ironwood (e.g. *Bangkirai, Carpinus caroliniana, Casuarina equisetifolia, Choricbangarpia subargentea, Copaifera* spp., *Eusideroglon wageri, Guajacum officinale, Guajacum sanctum, Hopea odorata*, Ipe, *Krugiodendron ferreum, Lyonothamnus lyonii floribundas*), *Mesua ferrea, Olea* spp., *Olneya tesota, Ostrya virginiana, Parrotia persica, Tabebuia serratifolia*); Jacarandâ; Jotoba; Lacewood; Laurel; Limba; Lignum vitae; Locust (e.g. *Robinia pseudacacia, Gleditsia triacanthos*); Mahogany, Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus muhlenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoumé; Oregon Myrtle; California Bay Laurel; Pear, Poplar (e.g. *P. balsamifera, P. nigra*, Hybrid Poplar (*Populus×canadensis*)); Ramin; Red cedar, Rosewood; Sal; Sandalwood; Sassafras; Satinwood; Silky Oak; Silver Wattle; Snakewood; Sourwood; Spanishcedar; American sycamore; Teak; Walnut (e.g. *Juglans nigra, Juglans regia*); Willow (e.g. *Salix nigra, Salix alba*); Yellowpoplar (*Liriodendron tulipifera*); Bamboo; Palmwood; and combinations/hybrids thereof.

For example, hardwood feedstocks for the present disclosure may be selected from *Acacia*, Aspen, Beech, *Eucalyptus*, Maple, Birch, Gum, Oak, Poplar, and combinations/hybrids thereof. The hardwood feedstocks for the present disclosure may be selected from *Populus* spp. (e.g. *P. grandidentata, P. tremula, P. tremuloides, P. balsamifera, P. deltoides, P. sargentii, P. heterophylla, P. balsamifera, P. nigra, Populus× canadensis*), *Eucalyptus* pp. (e.g. *E. astrigens, e. clivicola, E. dielsii, E. forrestiana, E. gardneri, E. globulus, E. nitans, E. occidentalis, E. ornata, E. salubris, E. spatbulata*), *Acacia* spp. (e.g. *A. albida, A. cavenia, A. dealbata, A. decurrens, A. framesiana, A. meamsii, A. melanoxylon, A. nilotica, A. penninervis, A. pycnatha, A. saligna*, and combinations thereof.

It has been found that derivatives of native lignin from hardwood feedstocks having an aliphatic hydroxyl content of about 2.35 mmol/g or less have a good level of antioxidant activity. For example, about 2.25 mmol/g or less, about 2 mmol/g or less, or about 1.75 mmol/g or less.

In the present disclosure, "aliphatic hydroxyl content" refers to the quantity of aliphatic hydroxyl groups in the lignin derivative and is the arithmetic sum of the quantity of Primary and Secondary Hydroxyl Groups (al-OH=pr-OH+sec-OH). The aliphatic hydroxyl content can be measured using quantitative $^{13}C$ high resolution NMR spectroscopy of acetylated lignin (using 1,3,5-trioxane as internal reference).

For the data analysis "BASEOPT" (DIGMOD set to baseopt) routine in TopSpin 2.1.4 was used to predict the first FID data point back at the mid-point of $^{13}C$ r.f. pulse in the digitally filtered data was used. For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^1H$, 150.90 MHz for $^{13}C$). The spectrometer was coupled with a Bruker QNP cryoprobe (5 mm NMR samples, $^{13}C$ direct observe on inner coil, 1H outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h.

Derivatives of native lignin according to the present disclosure, coming from hardwood feedstocks tend to have a normalized RSI of 30 or greater, 40 or greater, 50 or greater, 60 or greater, 70 or greater.

Softwood feedstocks include *Araucaria* (e.g. *A. cunninghamii, A. angustifolia, A. araucana*); softwood Cedar (e.g. *Juniperus virginiana, Thuja plicata, Thuja occidentalis, Chamaecyparis thyoides Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus semperviren*); Rocky Mountain Douglas-fir; European Yew; Fir (e.g. *Abies balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*); Pine (e.g. *Pinus nigra, Pinus banksiana, Pinus contorta, Pinus radiata,*

*Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar, fir; pine; spruce; and combinations thereof. The softwood feedstocks for the present disclosure may be selected from loblolly pine (*P. taeda*), radiata pine, jack pine, spruce (e.g., white, interior, black), Douglas fir, black spruce, and combinations/hybrids thereof. The softwood feedstocks for the present disclosure may be selected from pine (e.g. *Pinus radiata, Pinus taeda*); spruce; and combinations/hybrids thereof.

It has been found that derivatives of native lignin from softwood feedstocks having an aliphatic hydroxyl content of about 2.35 mmol/g or less have a good level of antioxidant activity. For example, about 2.25 mmol/g or less, about 2 mmol/g or less, or about 1.75 mmol/g or less.

Derivatives of native lignin according to the present disclosure, coming from softwood feedstocks tend to have a normalized RSI of 15 or greater, 25 or greater, 30 or greater, 35 or greater, 40 or greater.

Annual fibre feedstocks include, for example, flax; cereal straw (wheat, barley, oats, rye); bagasse; corn; hemp, fruit pulp, alfa grass, switchgrass, miscanthus, kenaf, and combinations/hybrids thereof. For example, the annual fibre feedstock may be selected from wheat straw, corn stover, corn cobs, sugar cane bagasse, and combinations/hybrids thereof.

Derivatives of native lignin according to the present disclosure, coming from annual fibre feedstocks tend to have a normalized RSI of 15 or greater, 20 or greater, 25 or greater, 30 or greater, 35 or greater.

In an embodiment of the present disclosure, derivatives of native lignin from annual fibre feedstocks have an aliphatic hydroxyl content of about 3.75 mmol/g or less; 3.5 mmol/g or less; 3.25 mmol/g or less; 3 mmol/g or less; 2.75 mmol/g or less; 2.5 mmol/g or less; 2.35 mmol/g or less; 2.25 mmol/g or less.

The derivatives of native lignin will vary with the type of process used to separate native lignins from cellulose and other biomass constituents. Examples of extractive technologies include (1) solvent extraction of finely ground wood; (2) acidic dioxane extraction (acidolysis) of wood; (3) steam explosion; or (4) acid hydrolysis methods. Furthermore, derivatives of native lignin can be recovered after pulping of lignocellulosic biomass including industrially operated kraft and soda pulping (and their modifications) and sulphite pulping. It should be noted that kraft pulping, sulphite pulping, and ASAM organosolv pulping will generate derivatives of native lignin containing significant amounts of organically-bound sulphur which may make them unsuitable for certain uses.

Four major "organosolv" pulping methods have been proposed. Organosolv extraction tends to produce highly-purified lignin mixtures. The first organosolv method uses ethanol/solvent pulping (aka the Alcell® process); the second organosolv method uses alkaline sulphite anthraquinone methanol pulping (aka the "ASAM" process); the third organosolv process uses methanol pulping followed by methanol, NaOH, and anthraquinone pulping (aka the "Organocell" process); the fourth organosolv process uses acetic acid/hydrochloric acid pulping (aka the "Acetosolv" process).

Organosolv extraction processes, particularly the Alcell® process, tend to be less aggressive and can be used to separate highly purified lignin and other useful materials from biomass without excessively altering or damaging the lignin. Such processes can therefore be used to maximize the value from all the components making up the biomass. Organosolv extraction processes however typically involve extraction at higher temperatures and pressures with a flammable solvent than other industrial methods and thus are generally more complex and expensive.

A description of the Alcell® process can be found in U.S. Pat. No. 4,764,596 (herein incorporated by reference). The process generally comprises pulping a fibrous biomass feedstock with primarily an ethanol/water solvent solution under conditions that included: (a) 60% ethanol/40% water, (b) temperature of about 180° C. to about 210° C., (c) pressure of about 20 atm to about 35 atm, and (d) a processing time ranging from 30 to 120 minutes. Derivatives of native lignin are fractionated from the native lignins into the pulping liquor which also receives solubilised hemicelluloses, other saccharides and other extractive such as resins, organic acids, phenols, and tannins. Organosols pulping liquors comprising the fractionated derivatives of native lignin and other extractives from the fibrous biomass feedstocks, are often called "black liquors". The organic acid extractives released by organosolv pulping significantly acidify of the black liquors to pH levels of about 5.5 and lower. After separation from the cellulosic pulps produced during the pulping process, the derivatives of native lignin are recovered from the black liquors by depressurization/flashing followed by dilution with cold water which will cause the fractionated derivatives of native lignin to precipitate thereby enabling their recovery by standard solids/liquids separation processes. Various disclosures exemplified by U.S. Pat. No. 7,465,791 and PCT Patent Application Publication No. WO 2007/129921, describe modifications to the Alcell® organosolv process for the purposes of increasing the yields of fractionated derivatives of native lignin recovered from fibrous biomass feedstocks during biorefining. Modifications to the Alcell® organosols process conditions included adjusting: (a) ethanol concentration in the pulping solution to a value selected from a range of 60%-80% ethanol, (b) temperature to a value selected from a range of 120° C. to 350° C., (c) pressure to a value selected from a range of 15 atm to 35 atm, and (d) processing time to a duration from a range of 20 minutes to about 2 hours. Some modifications to the Alcell® organosolv process also include the addition of an acid catalyst to the pulping solution to lower its pH to a value from the range of about 1.5-5.5.

The present disclosure provides a process for producing derivatives of native lignin from lignocellulosic biomass feedstocks wherein the lignin derivatives have certain aliphatic hydroxyl contents selected before pulping is commenced, said process comprising:

(a) pulping a fibrous biomass feedstock with an organic solvent/water solvent solution using a combination of the following operating conditions or parameters: (1) a selected organic solvent concentration, (2) a selected degree of acidification of the organic solvent, (3) a selected temperature at which the pulping is conducted, and (4) a selected time period during which pulping is conducted, (b) separating the cellulosic pulps from the black liquor produced during pulping, and (c) recovering derivatives of native lignin from the black liquor.

The organic solvent may be selected from short-chain aliphatic alcohols such as methanol, ethanol, propanol, and combinations thereof. For example, the solvent may be ethanol. The liquor solution may comprise about 20%, by weight, or greater, about 30% or greater, about 50% or greater, about 60% or greater, about 70% or greater, of ethanol.

The pH of the organic solvent may be adjusted to, for example, from about 1 to about 6, or from about 1.5 to about 5.5.

Step (a) of the process maybe carried out at a temperature of from about 100° C. and greater, or about 120° C. and greater, or about 140° C. and greater, or about 160° C. and greater, or about 170° C. and greater, or about 180° C. and greater. The process may be carried out at a temperature of from to about 300° C. and less, or about 280° C. and less, or about 260° C. and less, or about 240° C. and less, or about 220° C. and less, or about 210° C. and less, or about 205° C. and less, or about 200° C. and less.

Step (a) of the process may be carried out at a pressure of about 5 atm and greater, or about 10 atm and greater, or about 15 atm and greater, or about 20 atm and greater, or about 25 atm and greater, or about 30 atm and greater. The process may be carried out at a pressure of about 150 atm and less, or about 125 atm and less, or about 115 atm and less, or about 100 atm and less, or about 90 atm and less, or about 80 atm and less.

The fibrous biomass may be treated with the solvent solution of step (a) for about 1 minute or more, about 5 minutes or more, about 10 minutes or more, about 15 minutes or more, about 30 minutes or more. The fibrous biomass may be treated with the solvent solution of step (a) for about 360 minutes or less, about 300 minutes or less, about 240 minutes or less, about 180 minutes or less, about 120 minutes or less.

The present disclosure provides a process for producing a lignin derivative having an aliphatic hydroxyl content of about 2.35 mmol/g or less, about 2.25 mmol/g or less, about 2 mmol/g or less, or about 1.75 mmol/g or less. Said process comprises:
  a) commingling a fibrous biomass feedstock in a vessel with a selected organic solvent/water solvent solution having a selectively adjusted pH, wherein:
    i. the solution comprises about 30% or greater, by weight, of organic solvent; and
    ii. the pH of the organic solvent is adjusted from about 1 to about 5.5;
  b) heating the commingled fibrous biomass and pH-adjusted organic solvent to a temperature selected from the range of about 100° C. to about 300° C.;
  c) raising the pressure in the vessel to about 10 atm or greater;
  d) maintaining the elevated temperature and pressure for a period of time selected from the range of about 1 minute to about 360 minutes while continuously commingling fibrous biomass and pH-adjusted organic solvent thereby producing cellulosic pulps and a black liquor, and;
  e) separating the cellulosic pulps from the pulp liquor
  f) recovering derivatives of native lignin.
  g) Liquor-to-biomass ratios can be varied from 2:1 to 15:1 wt:wt The present disclosure provides a process for producing a hardwood lignin derivative having an aliphatic hydroxyl content of about 2.35 mmol/g or less, about 2.25 mmol/g or less, about 2 mmol/g or less, or about 1.75 mmol/g or less, said process comprises:
  a) pulping a fibrous biomass feedstock in a vessel with a pH-adjusted organic solvent/water solvent solution to form a liquor, wherein:
    i. the solution comprises a selected concentration of organic solvent of about 30% or greater; and
    ii. the pH of the organic solvent is selectively adjusted from about 1 to about 5.5;
  b) heating the liquor to a selected temperature of about 100° C. or greater;
  c) raising the pressure in the vessel to about 10 atm or greater;
  d) maintaining the elevated temperature and pressure for a selected period of time of 1 minute or longer;
  e) separating the cellulosic pulps from the pulp liquor
  f) recovering derivatives of native lignin.

The present disclosure provides a process for producing a softwood lignin derivative having an aliphatic hydroxyl content of about 2.35 mmol/g or less, about 2.25 mmol/g or less, about 2 mmol/g or less, or about 1.75 mmol/g or less, said process comprises:
  a) commingling a fibrous biomass feedstock in a vessel with a selected organic solvent/water solvent solution having a selectively adjusted pH, wherein:
    i. the solution comprises about 30% or greater, by weight, of organic solvent; and
    ii. the pH of the organic solvent is adjusted from about 1 to about 5.5;
  b) heating the commingled fibrous biomass and pH-adjusted organic solvent to a temperature selected from the range of about 100° C. to about 300° Q
  c) raising the pressure in the vessel to about 10 atm or greater,
  d) maintaining the elevated temperature and pressure for a period of time selected from the range of about 1 minute to about 360 minutes while continuously commingling fibrous biomass and pH-adjusted organic solvent thereby producing cellulosic pulps and a black liquor, and;
  e) separating the cellulosic pulps from the pulp liquor The present disclosure provides a process for producing an annual fibre lignin derivative having an aliphatic hydroxyl content of about 3.75 mmol/g or less; 3.5 mmol/g or less; 3.25 mmol/g or less; 3 mmol/g or less; 2.75 mmol/g or less; 2.5 mmol/g or less; 2.35 mmol/g or less; 2.25 mmol/g or less, said process comprises:
  a) commingling a fibrous biomass feedstock in a vessel with a selected organic solvent/water solvent solution having a selectively adjusted pH, wherein:
    i. the solution comprises about 30% or greater, by weight, of organic solvent; and
    ii. the pH of the organic solvent is adjusted from about 1 to about 5.5;
  b) heating the commingled fibrous biomass and pH-adjusted organic solvent to a temperature selected from the range of about 100° C. to about 300° C.;
  c) raising the pressure in the vessel to about 10 atm or greater;
  d) maintaining the elevated temperature and pressure for a period of time selected from the range of about 1 minute to about 360 minutes while continuously commingling fibrous biomass and pH-adjusted organic solvent thereby producing cellulosic pulps and a black liquor, and;
  e) separating the cellulosic pulps from the pulp liquor The present disclosure relates to methods for determining suitable operating conditions for organosolv pulping of lignocellulosic biomass feedstocks for production of derivatives of native lignin having certain desirable aliphatic hydroxyl contents. Such operating conditions may be determined, for example, by selecting a target operating value for each of at least two process parameters while keeping other process parameters constant. Suitable process parameters that can be manipulated by selection of target operating values include: (a) concentration of organic solvent in the pulping liquor, (b) degree of acidification of the organic solvent prior to commencing pulping, (c) temperature at which pulping is conducted, (d) duration of the pulping period, and (e) liquor-to-biomass ratios among others. Suitable target operating values can be determined by empirically modelling the performance results collected from a series of preliminary organosolv pulping runs with subsamples of a selected lignocellulosic feedstock wherein at least one process parameter has been adjusted between each of the runs. Exemplary performance results are the aliphatic hydroxyl contents of lignin derivatives recovered from each preliminary organosolv pulping run. A suitable number of preliminary pulping runs is about 10, or about 15, or about 20 about 25 or about 30. The performance results in combination with the manipulated process parameters can be used for equations for identification of suitable target operating values for one or more organosolv processing conditions for lignocellulosic biomass feedstocks from which lignin derivatives have desirable chemical or structural or functional attributes can be recovered. Such equations can be derived from performance results by mathematical tools and software exemplified by Matlab® Version 7.7.0.471 R2008b (Matlab is a registered trademark of The Mathworks Inc., Natick, Mass., USA) with a Model-Based Calibration Toolbox Version 3.5 supplied by The Mathworks Inc.

In reference to use of the Matlab software tools for generating the predictive equations for selected organosols process conditions, suitable model characteristics include:
  Model Class: Linear Models
  Linear Model Subclass: polynomial
  Interaction order: 2
Suitable model terms include:
  Constant terms: 1
  Linear terms: 4
  Second Order Terms: 10
  Total Number Terms: 15
  Stepwise: Minimize PRESS with 50 maximum iterations
Suitable experimental designs include:
  Experimental Design Type: Sobol Sequence
  Number of Points: all available points in Tables 1, 3, and 4
  Input factors: 4 (the process parameters Cooking time [Time], cooking temperature [Temperature], cooking pH [pH], solvent concentration [SOLVENT]
The maximum and minimum values used in each model should be those maximum and minimum values observed in the actual performance data points collected for both the input and output variables ("responses").

This modelling approach can be used to select and manipulate organosolv process conditions to recover lignin derivatives that have certain targeted ranges of chemical and/or structural attributes, for example, one or more of:
  non-conjugated carbonyl groups/g lignin derivative in the range of about 0.09 to about 1.62 CO-nc mmol/g;
  conjugated carbonyl groups/g lignin derivative in the range of about 0.31 to about 1.36 CO-conj mmol/g;
  total carbonyl groups/g lignin derivative in the range of about 0.51 to about 2.72 CO tot mmol/g;
  primary hydroxyl groups/g lignin derivative in the range of about 0.48 to about 3.62 pr-OH mmol/g;
  secondary hydroxyl groups/g lignin derivative in the range of about 0 to about 3.19 sec-OH sec mmol/g;
  aliphatic hydroxyl groups/g lignin derivative in the range of about 0.53 to about 6.62 al-OH mmol/g;
  phenolic hydroxyl groups/g of lignin derivative in the range of about 2.00 mmol to about 7.12 ph-OH mmol/g;
  total hydroxyl groups/g lignin derivative in the range of about 4.73 to about 10.28 tot-OH mmol/g;
  0 to about 2.46 mmol/g of aliphatic carboxylic and/or aliphatic ester groups (COOR al mmol/g);
  conjugated carboxylic and/or conjugated ester groups/g lignin derivative in the range of about 0 to about 2.20 COOR con mmol/g;
  carboxylic or ester group/g lignin derivative in the range of about 0 to about 4.46 COOR tot mmol/g;
  methoxyl groups/g lignin derivative in the range of about 3.61 to about 8.46 0-me mmol/g;
  ethoxyl or other alkoxy groups/g lignin derivative in the range of about 0.28 to about 1.34 0-et mmol/g;
  syringyl groups/g lignin derivative in the range of about 0 to about 3.60 S mmol/g;
  guaiacyl groups/g lignin derivative in the range of about 1.33 to about 7.78 G mmol/g;
  S/G ratio in the range of about 0.41 to about 41.87;
  0 to about 1.91 p-hydroxyphenyl units (or H-units)/g lignin derivative mmol/g;
  β-5 structural moitie/g lignin derivative in the range of about 0 to about 0.68 mmol/g;
  β-(3 structural moitiey/g lignin derivative in the range of about 0 to about 0.46 β-β mmol/g;
  β-O-4 structural moitiey/g lignin derivative in the range of about 0 to about 2.66 (3-O-4 mmol/g;
  degree of condensation (DC) in the range of about 0.78 to about 85.0%;
  number-average molecular weight (Mn, g/mol) in the range of about 536.50 Daltons to about 1464.00 Daltons;
  weight-average molecular weight (Mw, g/mol) in the range of about 965.00 Daltons to about 3366.50 Daltons;
  Z average molecular weight (Mz, g/mol) in the range of about 1378.50 Daltons to about 5625.00 Daltons;
  polydispersity (D) in the range of about 1.46 to about 3.04 (Mw/Mn);
  carbon content (% dry weight) in the range of about 60.54% to about 72.50%;
  hydrogen content (% dry weight) in the range of about 4.52% to about 7.24%; and
  oxygen content (% dry weight) in the range of about 21.90% to about 35.38%;
  nitrogen content (% dry weight) in the range of about 0.08% to about 2.82%;
  sulphur content (% dry-weight) in the range of about 0.50% to about 1.25%.

This modelling approach can be used to select and manipulate organosolv process conditions to recover lignin derivatives that have certain targeted ranges of functional attributes, for example, one or more of:
  radical scavaging index (RSI) in the range of about 5.44 to about 53.36;
  glass transition temperature (Tg) in the range of about 51° C. to about 127° C.;
  melt flow index (MFI) in the range of about 0 g/10 min to about 878.00 g/10 sec;
  viscosity (V) of a phenol-formaldehyde resin containing these lignin derivatives at 40% phenol replacement level in the range of about 50 cP to about 20,000 cP; and
  normalized shear strength as measured by the automated bonding evaluation system (ABES) of a phenol-formaldehyde resin where 40% of the phenol has been replaced by the lignin derivative about 2,034 MPa*cm$^2$/g to about 3796 MPa*cm$^2$/g.

The derivatives of native lignin recovered with the processes described herein may be incorporated into polymer compositions. The compositions herein may comprise a lignin derivative according to the present disclosure and a polymer-forming component. As used herein, the term 'polymer-forming component' means a component that is capable of being polymerized into a polymer as well as a polymer that has already been formed. For example, in certain embodiments the polymer-forming component may comprise monomer units which are capable of being polymerized. In certain embodiments the polymer component may comprise oligomer units that are capable of being polymerized. In certain embodiments the polymer component may comprise a polymer that is already substantially polymerized.

Polymers forming components for use herein may result in thermoplastic polymers such as epoxy resins, urea-formaldehyde resins, polyimides and the like, and thermosets such as phenol-formaldehyde resins, and the like. For example, polyalkenes such as polyethylene or polypropylene.

Typically, the lignin derivative will comprise from about 0.1%, by weight, or greater, about 0.5% or greater, about 1% or greater, of the composition. Typically, the lignin derivative will comprise from about 80%, by weight, or less, about 60% or less, about 40% or less, about 20% or less, about 10% or less, about 5% or less, of the composition.

The compositions comprise lignin derivative and polymer-forming component but may comprise a variety of other optional ingredients such as adhesion promoters; biocides (antibacterials, fungicides, and moldicides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; foaming agents; defoamers; hardeners; odorants; deodorants; antifouling agents; viscosity regulators; waxes; and combinations thereof.

The present disclosure provides the use of the present derivatives of native lignin as an antioxidant. For example, the present use may be as an antioxidant additive for use with thermoplastic polymers such as polyethylene, polypropylene, polyamides, and combinations thereof.

The present disclosure provides methods of producing derivatives of native lignin having an aliphatic hydroxyl content of about 2.35 mmol/g or less, about 2.25 mmol/g or less, about 2 mmol/g or less, or about 1.75 mmol/g or less.

The present disclosure provides methods of producing derivatives of native hardwood lignin having an aliphatic hydroxyl content of about 2.35 mmol/g or less result, about 2.25 mmol/g or less, about 2 mmol/g or less, or about 1.75 mmol/g or less.

The present disclosure provides methods of producing derivatives of native softwood lignin having an aliphatic hydroxyl content of about 2.35 mmol/g or less, about 2.25 mmol/g or less, about 2 mmol/g or less, or about 1.75 mmol/g or less.

The present disclosure provides methods of producing derivatives of native annual fibre lignin having an aliphatic hydroxyl content of about 3.75 mmol/g or less; 3.5 mmol/g or less; 3.25 mmol/g or less; 3 mmol/g or less; 2.75 mmol/g or less; 2.5 mmol/g or less; 2.35 mmol/g or less; 2.25 mmol/g or less.

The present disclosure provides methods of producing derivatives of native lignin having a normalized RSI of 15 or greater, 20 or greater, 25 or greater, 30 or greater, 35 or greater, 40 or greater, 50 or greater, 60 or greater, 70 or greater.

The present disclosure provides methods of producing derivatives of native hardwood lignin having a normalized RSI of 15 or greater, 20 or greater, 25 or greater, 30 or greater, 35 or greater, 40 or greater, 50 or greater, 60 or greater, 70 or greater.

The present disclosure provides methods of producing derivatives of native softwood lignin having a normalized RSI of 15 or greater, 20 or greater, 25 or greater, 30 or greater, 35 or greater, 40 or greater.

The present disclosure provides methods of producing derivatives of native annual fibre lignin having a normalized RSI of 15 or greater, 20 or greater, 25 or greater, 30 or greater, 35 or greater.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

One or more currently preferred embodiments of the invention have been described by way of example. The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The following examples are intended to be exemplary of the invention and are not intended to be limiting.

EXAMPLES

EXAMPLE 1

Recovery of Derivatives of Native Lignin from Hardwood Feedstocks, Softwood Feedstocks, and Annual Fibre Feedstocks The three hardwood feedstocks chips were prepared from: (1) aspen trees grown in British Columbia, Canada, (2) acacia grown in Chile, and (3) eucalyptus grown in Chile. Subsamples of the three hardwood plant species were individually pulped using an autocatalysed ethanol pulping process organosols process wherein a different set of pulping conditions was used for each subsample. The individual sets of pulping conditions applied to hardwood species are listed in Tables 1(a)-1(c). Twenty seven different combinations of pulping conditions were tested with each of BC aspen (Table 1(a)), Chilean *Acacia dealbata* (Table 1(b)), and Chilean *Eucalyptus* nitens (Table 1(c)).

For each subsample, the ethanol pulping solvent was prepared as listed in its respective table. First, the ethanol was partially diluted with water after which, a suitable amount of sulphuric acid was added to achieve the target final acidity after which, the ethanol solution was further diluted with water to achieve the target ethanol concentration.

The raw lignin content of each fibrous biomass subsample was determined using the Klason lignin determination method. Then, after adding the fibrous biomass subsample to a pressure vessel (100-700 g odw chips), the tailored ethanol-based pulping solvent was added to the vessel (6:1 liquor:wood ratio), after which it was pressurized and brought up to the target temperature listed in the table. The biomass subsample was then "cooked" for the specified period of time after which, the pulping process was stopped. After pulping, the derivatives of native lignin were recovered by transferring the contents of the pressure vessel to a press. The solids were then squeezed in a press and filtered through a coarse silk screen which separated the chip residues from the fine particles and the liquids. Next, the fine particles were separated from the liquids by filtering the suspension separated from the chip residues, through fine filter paper. The fine particles represent derivatives of native lignin that were extracted and which precipitated from solution after cooling and is herein referred to as self-precipitated derivatives of native lignin designated in the tables as "SPL". Finally, the derivatives of native lignin still remaining in the filtered liquid were precipitated from solution by dilution with cold water. The derivatives of native lignin precipitated by cold-water dilution are referred to herein as precipitated lignin or "PL". After determination of the dry weights of SPL and PL derivatives of native lignin, the relative yield of each lignin derivative was determined in reference to the total lignin value determined for the biomass sample before pulping. The original lignin and carbohydrates content of each fibrous biomass subsample was determined using the methods described in National Renewable Energy Laboratory (NREL) Technical Report entitled "Determination of Structural Carbohydrates and Lignin in Biomass"—Laboratory Analytical Procedure (TP-510-42618 (25 Apr. 2008)). Ash and extractives content were evaluated according to the standard TAPPI procedures. The yields of SPL and PL derivatives of native lignin for each subsample are expressed on a weight % basis relative to the total lignin value in raw biomass, and listed in Tables 1(a)-1(c) for the hardwood feedstocks, Tables 3(a)-3(c) for the softwood feedstocks, and Tables 4(a)-4(c) for the annual fibre feedstocks in columns next to the processing conditions used for each subsamples. Table 2 shows the chemical composition of the raw lignocellulosic biomass samples used in this disclosure. The chip residues remaining after the first filtering step were pressed, dried and weighed. The yield of de-lignified residues, "pulp", (referred to in Tables 1, 3, 4 as "PBY") is expressed on a % basis relative to the dry weight of the pre-pulping biomass subsample.

TABLE 1(a)

Organosolv processing conditions for hardwood feedstocks.
BC aspen

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 1 | 2.09 | 65 | 196 | 60 | 82.7 | 0.48 | 0.05 | 0.53 | 102.63 |
| 2 | 2.03 | 104 | 197 | 68 | 61.4 | 0.58 | 0.00 | 0.58 | 94.12 |
| 3 | 2.02 | 114 | 195 | 43 | 43.6 | 0.66 | 0.10 | 0.76 | 90.90 |
| 4 | 1.97 | 89 | 172 | 79 | 62.2 | 0.78 | 0.05 | 0.83 | 79.83 |
| 5 | 2.17 | 83 | 189 | 64 | 71.6 | 0.78 | 0.11 | 0.89 | 81.02 |
| 6 | 1.78 | 30 | 170 | 59 | 65.8 | 0.84 | 0.11 | 0.95 | 62.80 |
| 7 | 1.96 | 42 | 176 | 51 | 68.7 | 0.87 | 0.11 | 0.98 | 89.63 |
| 8 | 2.12 | 101 | 180 | 48 | 61.6 | 0.89 | 0.16 | 1.05 | 71.83 |
| 9 | 2.06 | 27 | 193 | 51 | 65.7 | 1.03 | 0.06 | 1.09 | 83.85 |
| 10 | 2.52 | 90 | 171 | 77 | 53.8 | 1.15 | 0.00 | 1.15 | 67.17 |
| 11 | 2.18 | 50 | 205 | 45 | 58.2 | 0.96 | 0.27 | 1.22 | 74.68 |
| 12 | 1.64 | 60 | 167 | 43 | 49.7 | 1.08 | 0.18 | 1.27 | 87.80 |
| 13 | 2.29 | 115 | 201 | 73 | 60.1 | 1.00 | 0.38 | 1.38 | 67.68 |
| 14 | 2.00 | 33 | 181 | 44 | 55.9 | 1.13 | 0.30 | 1.43 | 85.54 |
| 15 | 2.22 | 94 | 177 | 47 | 58.3 | 1.41 | 0.35 | 1.76 | 57.41 |
| 16 | 2.34 | 44 | 174 | 68 | 51.3 | 1.24 | 0.54 | 1.78 | 56.63 |
| 17 | 2.30 | 87 | 183 | 54 | 63.8 | 1.32 | 0.52 | 1.84 | 64.00 |
| 18 | 2.29 | 46 | 169 | 73 | 52.4 | 1.54 | 0.43 | 1.97 | 60.54 |
| 19 | 2.26 | 63 | 190 | 47 | 46.8 | 1.39 | 0.75 | 2.13 | 60.51 |
| 20 | 2.10 | 21 | 166 | 46 | 38.5 | 1.44 | 0.78 | 2.21 | 61.98 |
| 21 | 2.70 | 82 | 191 | 41 | 49.5 | 1.41 | 0.97 | 2.38 | 62.85 |
| 22 | 2.81 | 113 | 180 | 67 | 48.2 | 1.94 | 1.34 | 3.28 | 44.02 |
| 23 | 3.30 | 107 | 170 | 61 | 35.5 | 2.00 | 2.00 | 3.99 | 27.27 |
| 24 | 3.27 | 100 | 166 | 65 | 27.6 | 2.16 | 1.95 | 4.11 | 34.71 |
| 25 | 2.94 | 56 | 176 | 60 | 42.0 | 2.21 | 2.04 | 4.25 | 36.85 |
| 26 | 1.87 | 67 | 194 | 58 | 106.0 | 0.60 | 0.05 | 4.37 | 97.39 |
| 27 | 1.68 | 79 | 173 | 49 | 62.1 | 0.79 | 0.11 | 4.46 | 84.41 |

TABLE 1(b)

Chilean *Acacia dealbata*

| Run # | pH | Acid % | Time min | Temp. °C. | Ethanol % | PL % | OH-pr mmol/g | OH-sec mmol/g | OH-al mmol/g | NRSI |
|---|---|---|---|---|---|---|---|---|---|---|
| 1 | 2.01 | 1.61 | 104 | 197 | 68 | 67.88 | 0.76 | 0.00 | 0.76 | 121.76 |
| 2 | 2.11 | 1.00 | 114 | 195 | 43 | 46.56 | 1.24 | 0.00 | 1.24 | 130.15 |
| 3 | 2.20 | 1.28 | 65 | 196 | 60 | 65.67 | 0.69 | 0.75 | 1.44 | 93.15 |
| 4 | 2.00 | 1.51 | 67 | 194 | 58 | 66.21 | 1.08 | 0.38 | 1.46 | 94.90 |
| 5 | 1.90 | 2.47 | 42 | 176 | 51 | 63.39 | 1.25 | 0.30 | 1.55 | 86.39 |
| 6 | 2.03 | 1.31 | 89 | 172 | 79 | 47.77 | 0.91 | 0.73 | 1.64 | 90.37 |
| 7 | 1.96 | 1.40 | 33 | 181 | 44 | 51.05 | 1.32 | 0.75 | 2.07 | 75.59 |
| 8 | 2.35 | 0.60 | 50 | 205 | 45 | 51.25 | 1.48 | 0.83 | 2.31 | 80.44 |
| 9 | 2.22 | 0.90 | 83 | 189 | 64 | 54.92 | 1.20 | 1.33 | 2.53 | 85.22 |
| 10 | 2.16 | 1.01 | 27 | 193 | 51 | 54.00 | 1.44 | 1.11 | 2.54 | 72.39 |
| 11 | 2.40 | 0.81 | 90 | 171 | 77 | 36.50 | 1.82 | 0.79 | 2.60 | 71.61 |
| 12 | 2.04 | 1.60 | 79 | 173 | 49 | 61.53 | 1.20 | 1.58 | 2.78 | 63.46 |

TABLE 1(b)-continued

Chilean *Acacia dealbata*

| Run # | pH | Acid % | Time min | Temp. °C. | Ethanol % | PL % | OH-pr mmol/g | OH-sec mmol/g | OH-al mmol/g | NRSI |
|---|---|---|---|---|---|---|---|---|---|---|
| 13 | 1.79 | 2.41 | 30 | 170 | 59 | 59.10 | 1.29 | 1.53 | 2.82 | 74.95 |
| 14 | 1.82 | 2.20 | 60 | 167 | 43 | 53.70 | 1.45 | 1.57 | 3.02 | 68.76 |
| 15 | 2.58 | 0.51 | 115 | 201 | 73 | 49.61 | 2.03 | 1.33 | 3.36 | 92.49 |
| 16 | 2.27 | 0.81 | 101 | 180 | 48 | 56.26 | 1.77 | 2.01 | 3.78 | 57.24 |
| 17 | 2.44 | 0.61 | 94 | 177 | 47 | 50.46 | 2.24 | 1.64 | 3.88 | 82.07 |
| 18 | 2.34 | 0.90 | 46 | 169 | 73 | 38.40 | 1.85 | 2.08 | 3.93 | 54.83 |
| 19 | 2.42 | 0.61 | 87 | 183 | 54 | 54.44 | 2.34 | 1.65 | 3.99 | 73.34 |
| 20 | 2.38 | 0.70 | 44 | 174 | 68 | 35.32 | 2.59 | 1.45 | 4.04 | 69.02 |
| 21 | 2.75 | 0.20 | 82 | 191 | 41 | 38.49 | 2.42 | 1.76 | 4.18 | 59.07 |
| 22 | 2.18 | 1.09 | 21 | 166 | 46 | 42.54 | 2.43 | 1.78 | 4.21 | 61.29 |
| 23 | 2.40 | 0.51 | 63 | 190 | 47 | 50.98 | 2.38 | 1.88 | 4.26 | 61.15 |
| 24 | 3.19 | 0.11 | 100 | 166 | 65 | 14.07 | 3.21 | 2.45 | 5.66 | 54.54 |
| 25 | 2.80 | 0.30 | 113 | 180 | 67 | 36.52 | 3.13 | 2.55 | 5.68 | 49.80 |
| 26 | 2.93 | 0.20 | 56 | 176 | 60 | 27.88 | 2.98 | 2.98 | 5.95 | 47.02 |
| 27 | 3.20 | 0.10 | 107 | 170 | 61 | 25.97 | 3.43 | 3.19 | 6.62 | 57.85 |

TABLE 1(c)

Chilean *Eucalyptus nitens*

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 1 | 1.88 | 104 | 197 | 68 | 81.7 | 0.57 | 0.13 | 0.70 | 109.66 |
| 2 | 1.96 | 67 | 194 | 58 | 77.4 | 0.58 | 0.19 | 0.78 | 108.27 |
| 3 | 2.01 | 65 | 196 | 60 | 81.8 | 0.62 | 0.25 | 0.86 | 119.66 |
| 4 | 1.93 | 114 | 195 | 43 | 43.9 | 0.88 | 0.20 | 1.08 | 112.88 |
| 5 | 2.53 | 115 | 201 | 73 | 61.8 | 0.72 | 0.50 | 1.22 | 101.95 |
| 6 | 2.10 | 83 | 189 | 64 | 69.4 | 0.76 | 0.69 | 1.46 | 91.17 |
| 7 | 2.05 | 89 | 172 | 79 | 53.0 | 0.91 | 0.56 | 1.47 | 92.24 |
| 8 | 1.87 | 79 | 173 | 49 | 63.6 | 0.88 | 0.61 | 1.49 | 67.29 |
| 9 | 2.17 | 27 | 193 | 51 | 66.8 | 0.86 | 0.73 | 1.60 | 87.59 |
| 10 | 2.17 | 101 | 180 | 48 | 63.4 | 0.91 | 0.70 | 1.61 | 85.93 |
| 11 | 2.25 | 90 | 171 | 77 | 48.9 | 1.01 | 0.68 | 1.69 | 94.66 |
| 12 | 1.90 | 33 | 181 | 44 | 59.5 | 1.09 | 0.61 | 1.70 | 87.78 |
| 13 | 1.74 | 42 | 176 | 51 | 66.9 | 1.17 | 0.55 | 1.73 | 81.93 |
| 14 | 1.77 | 30 | 170 | 59 | 61.6 | 1.11 | 0.72 | 1.83 | 77.44 |
| 15 | 1.65 | 60 | 167 | 43 | 57.3 | 1.13 | 0.71 | 1.84 | 83.29 |
| 16 | 2.26 | 46 | 169 | 73 | 48.5 | 1.07 | 1.19 | 2.27 | 75.61 |
| 17 | 2.30 | 87 | 183 | 54 | 65.6 | 1.20 | 1.07 | 2.27 | 75.59 |
| 18 | 2.30 | 44 | 174 | 68 | 49.0 | 1.37 | 1.18 | 2.55 | 69.83 |
| 19 | 2.30 | 50 | 205 | 45 | 66.7 | 1.87 | 0.73 | 2.60 | 83.34 |
| 20 | 2.34 | 63 | 190 | 47 | 61.9 | 2.07 | 0.55 | 2.63 | 78.71 |
| 21 | 2.66 | 82 | 191 | 41 | 43.4 | 1.58 | 1.23 | 2.81 | 68.29 |
| 22 | 2.49 | 113 | 180 | 67 | 55.1 | 2.04 | 1.23 | 3.26 | 60.61 |
| 23 | 2.00 | 21 | 166 | 46 | 50.5 | 1.47 | 1.96 | 3.43 | 69.66 |
| 24 | 2.33 | 94 | 177 | 47 | 63.3 | 1.20 | 2.41 | 3.61 | 75.05 |
| 25 | 2.82 | 56 | 176 | 60 | 42.7 | 2.74 | 2.02 | 4.76 | 45.98 |
| 26 | 3.22 | 107 | 170 | 61 | 43.6 | 2.70 | 2.70 | 5.40 | 55.27 |
| 27 | 3.13 | 100 | 166 | 65 | 25.6 | 3.07 | 2.45 | 5.52 | 36.93 |

TABLE 2

Chemical composition of lignocellulosic biomass samples (% dry weight)

| Biomass Sample | Arabinan | Galactan | Glucan | Xylan | Mannan | Lignin | Ash | Extractives |
|---|---|---|---|---|---|---|---|---|
| Alberta Wheat Straw | 2.39 | 0.67 | 41.10 | 22.41 | 0 | 20.94 | 4.96 | 1.40 |
| Chilean *Acacia dealbata* | 0.55 | 0.64 | 44.65 | 19.78 | 1.35 | 22.85 | 0.54 | 1.63 |
| Brazilian Sugarcane Bagasse | 1.87 | 0.51 | 38.15 | 21.79 | 0.21 | 24.10 | 5.39 | 1.36 |

TABLE 2-continued

Chemical composition of lignocellulosic biomass samples (% dry weight)

| Biomass Sample | Arabinan | Galactan | Glucan | Xylan | Mannan | Lignin | Ash | Extractives |
|---|---|---|---|---|---|---|---|---|
| British Columbia Hybrid Spruce (*Picea engelmannii* × *Picea glauca*) | 1.00 | 2.00 | 43.75 | 4.97 | 11.70 | 22.85 | 1.00 | 0.86 |
| Chilean *Pinus radiata* | 1.52 | 2.73 | 46.04 | 6.12 | 11.36 | 24.15 | 0.67 | 0.37 |
| European Corn Cobs | 3.07 | 1.02 | 35.79 | 30.85 | 0 | 18.41 | 1.43 | 1.63 |
| Southeastern US *Pinus taeda* | 1.40 | 2.61 | 41.64 | 6.87 | 10.10 | 30.84 | 0.54 | 2.06 |
| British Columbia Aspen (*Populus tremuloides*) | 0.44 | 0.43 | 48.76 | 16.44 | 1.48 | 22.84 | 0.25 | 2.63 |
| Chilean *Eucalyptus nitens* | 0.96 | 0.61 | 47.70 | 17.52 | 1.12 | 27.57 | 0.01 | 0.99 |

Characterization of the Aliphatic Hydroxyl Content of Derivatives of Native Lignin Recovered from Three Species of Hardwoods.

Derivatives of native lignin recovered from hardwood feedstocks were analyzed to determine mmol of primary hydroxyl groups/g sample (OH-pr mmol/g) and mmol of secondary hydroxyl groups/g sample (OH-sec mmol/g). These data were then used to calculate mmol aliphatic hydroxyl groups/g sample (OH-al mmol/g).

The hydroxyl contents were determined by analyses of NMR spectra recorded on a Bruker 700 MHz spectrometer equipped with Cryoprobe at 300 K using ca 30% solutions of sample in DMSO-$d_6$. Chemical shifts were referenced to TMS (0.0 ppm). To ensure more accurate baseline, especially in the carbonyl region (215-185 ppm), the spectra were recorded over the interval 240-(–40) ppm. The following conditions were provided for the quantitative $^{13}$C-NMR:

1. Inverse gate detection;
2. a 90° pulse;
3. Complete relaxation of all nuclei was achieved by addition of chromium (III) acetylacetonate (0.01 M) with a 1.2 s acquisition time and 1.7 s relaxation delay.

The NMR spectra were Fourier-transformed, phased, calibrated using TMS signals as a reference (0 ppm), and the baseline was corrected by using a polynomial function. The correction of baseline was done using the following interval references for adjustment to zero: (220-215 ppm)-(185-182 ppm)-(97-92 ppm)-(5-(–20)ppm). No other regions were forced to 0. The signals in the quantitative $^{13}$C NMR. spectra were assigned on the base of 2D HSQC NMR and a known database. After the baseline correction the spectra were integrated using the area of internal standard (1S), trioxane, as the reference. Each spectrum was processed (as described) at least twice to ensure good reproducibility of the quantification. The calculation of the quantity of specific moieties was done as follows:

For non-acetylated lignins: $X$ (mmol/g=$I_x*m_{IS}$/ $(30m_{Lig}*I_{IS})*1000$

For acetylated lignins: $X$ (mmol/g=$I_x*m_{IS}$/ $(30m_{Lig}*I_{IS}-42*I_{OHtotal}*m_{IS})*1000$ Where X was the amount of the specific moiety; $I_x$, and $I_{IS}$ and $I_{OHtotal}$ were the resonance values of the specific moiety (Table 3), the internal standard and total OH groups, correspondingly; $m_{Lig}$ and $m_{IS}$ are the masses of the lignin and internal standard.

TABLE 3

| Symbol | $I_X$ in Calculation Equation | Analytical Method |
|---|---|---|
| OH-pr mmol/g | Resonance at 171.5-169.7 ppm in the quantitative $^{13}$C NMR spectra of acetylated lignins minus resonance at 171.5-169.7 ppm in the quantitative 13C NMR spectra of non-acetylated lignins | Quantitative $^{13}$C High Resolution NMR of acetylated lignin using 1,3,5-trioxane as internal reference |
| OH-sec mmol/g | Resonance at 169.7-169.2 ppm in the quantitative $^{13}$C NMR spectra of acetylated lignins minus resonance at 169.7-169.2 ppm in the quantitative 13C NMR spectra of non-acetylated lignins | Quantitative $^{13}$C High Resolution NMR of acetylated lignin using 1,3,5-trioxane as internal reference |
| OH-al mmol/g | OH-al = OH-pr + OH-sec | |

The aliphatic hydroxyl content of the PL lignin derivatives from each of the twenty seven samples of aspen chips are shown in Table 1(a). The contents ranged from 0.70 mmol/g in run 1 to 5.52 mmol/g in run 27.

The aliphatic hydroxyl contents of the PL lignin derivatives from each of the twenty seven samples of acacia chips are shown in Table 1(b). The contents ranged from 0.76 mmol/g in run 1 to 6.62 mmol/g in run 27.

The aliphatic hydroxyl contents of the PL lignin derivatives from each of the twenty seven samples of eucalyptus chips are shown in Table 1(c). The contents ranged from 0.70 mmol/g in run 1 to 5.52 mmol/g in run 27.

Characterization of the NRSI of Derivatives of Native Lignin Recovered from Three Species of Hardwoods.

Each of the lignin derivative subsamples produced above was assessed for its radical scavenging index (RSI). The potential antioxidant activity of each PL lignin derivative was determined by measuring its radical savaging capacity. The assay used 2,2-diphenyl-1-picrylhydrazyl (DPPH), a stabile free radical which absorbs light strongly at 515 nm to measure a compound's radical scavenging index (RSI). In its radical form, DPPH. absorbs strongly at 515 nm and has a deep purple colour. As DPPH gives up its free electron to radical scavengers, it loses its purple colour and its absorbance shifts to 520 nm. The greater the drop in DPPH absorbance at 515 nm after a test compound has been added to the DPPH solution, the higher the compound's free RSI and also, its antioxidant activity. In the present study, Vit. E and BHT were used as positive controls. PL lignin derivative subsamples (1.0-2.0 mg), Vit. E control samples (1.0-2.0 mg), and BHT control samples (6.0-8.0 mg) were prepared for testing by being placed into epitubes after which, each was diluted with 1.0 mL of 90% (v/v) aqueous dioxane, vortexed, transferred to new epitubes and then further diluted 50/50 with 90% aqueous dioxane to give stock concentrations of 0.5-1.0 mg/mL for samples and Vitamin E and 3.0-4.0 mg/mL for BHT. An indicating (purple) DPPH stable free radical solution is made by dissolving 3.78 mg DPPH in 100 mL 90% dioxane (95.9 µM). Samples and standards are serial diluted to fill columns of a quartz 96-well plate (8 dilutions). The assays were performed by placing aliquots of the sample stock solutions into two rows of wells in a 96-well plate. The first row served as the reference row while the second row received DPPH aliquots. 165 µL of 90% dioxane was added to each well and mixed. Aliquots of the mixed samples in each row are transferred to the adjacent row with is further diluted with 165 µL of 90% dioxane in each well. The mixing, transferring and dilution are repeated until the last row of wells was prepared. The same volume of aliquots was removed from the last row. The 96-well plate also contains a row of wells that received only the 90% dioxane. In the final step of the preparation procedure, 165 µL of the DPPH solution is added to all the control and analytical columns by using an 8-channel auto-pipette and an Eppendorf® reagent reservoir as quickly as possible. As soon as all reagents were added, the plate was placed into a plate-reading spectrophotometer, and absorbance measurements were performed. The program for the spectrophotometer (SOFTmax software) consists of a timing sequence of 16 min and a reading of the entire plate at 515 nm. RSI (radical scavenging index) is defined as the inverse of the concentration which produces 50% inhibition in DPPH absorbance at 515 nm. The results are then 'normalized' by dividing sample RSI by the RSI value for the BHT control.

The NRSI values for lignin derivatives recovered from BC aspen are shown in Table 1(a). The NRSI values for lignin derivatives recovered from Chilean acacia biomass are shown in Table 1(b). The NRSI values for lignin derivatives recovered from Chilean eucalyptus biomass are shown in Table 1(c).

EXAMPLE 2

Recovery of Derivatives of Native Lignin from Softwood Feedstocks

Three softwood feedstocks chips were prepared from: (1) hybrid spruce (*Picea engelmannii*×*Picea glauca*) trees grown in British Columbia, (1) radiata pine grown in Chile, and (2) loblolly pine (*Pinus taeda*) grown in the southeast USA. Subsamples of the three plant species were individually pulped using an autocatalysed ethanol pulping process wherein a different set of pulping conditions was used for each subsample.

The individual sets of pulping conditions applied to softwood species are listed in Tables 3(a)-3(c). Twenty nine different combinations of pulping conditions were tested with each of BC hybrid spruce (Table 3(a)) and Chilean radiata pine (Table 3(b)), while 30 combinations of pulping combinations were tested with southeastern US loblolly pine (Table 3(c)).

For each subsample, the ethanol pulping solvent was prepared as listed in its respective table. First, the ethanol was partially diluted with water after which, a suitable amount of sulphuric acid was added to achieve the target final acidity after which, the ethanol solution was further diluted with water to achieve the target ethanol concentration.

The raw lignin content of each fibrous biomass subsample was determined using the methods described in National Renewable Energy Laboratory (NREL) Technical Report entitled "Determination of Structural Carbohydrates and Lignin in Biomass"—Laboratory Analytical Procedure (TP-510-42618 (25 Apr. 2008)). Then, after adding the fibrous biomass subsample to a pressure vessel (100-700 g odw chips), the tailored ethanol-based pulping solvent was added to the vessel (6:1 liquid:wood ratio) after which it was brought up to the target temperature and pressure listed in the table. The biomass subsample was then "cooked" for the specified period of time, after which, the pulping process was stopped. After pulping, the derivatives of native lignin were recovered by transferring the contents of pressure vessel to a press. The solids were then squeezed in a press and filtered through a coarse silk screen which separated the chip residues from the fine particles and the liquids. Next, the fine particles were separated from the liquids by filtering the suspension separated from the chip residues, through fine filter paper. The fine particles represent derivatives of native lignin that were extracted and which precipitated from solution after cooling and is herein referred to as self-precipitated derivatives of native lignin designated in the tables as "SPL". Finally, the derivatives of native lignin still remaining in the filtered liquid were precipitated from solution by dilution with cold water. The derivatives of native lignin precipitated by cold-water dilution are referred to herein as precipitated lignin or "PL". After determination of the dry weights of SPL and PL derivatives of native lignin, the relative yield of each lignin derivative was determined in reference to the total lignin value determined for the biomass sample before pulping. The yields of SPL and PL derivatives of native lignin for each subsample are expressed on a weight % basis relative to its total lignin value, and listed in Tables 4(a)-4(c) for the softwood feedstocks in columns next to the processing conditions used for each subsamples. The chip residues remaining after the first filtering step were pressed, dried and weighed. The yield of de-lignified residues, "pulp" referred to in Tables 4(a)-4(c) as "PBY", are expressed on a % yield basis relative to the dry weight of the pre-pulping biomass subsample.

Characterization of the Aliphatic Hydroxyl Content of Derivatives of Native Lignin Recovered from Three Species of Softwoods.

Derivatives of native lignin recovered from softwood feedstocks were analyzed as discussed above to determine mmol primary hydroxyl groups/g sample (OH-pr mmol/g) and mmol secondary hydroxyl groups/g sample (OH-sec mmol/g). These data were then used to calculate mmol aliphatic hydroxyl groups/g sample (OH-al mmol/g).

The aliphatic hydroxyl contents of the PL lignin derivatives from each of the twenty nine samples of spruce woodchips are shown in Table 4(a). The contents ranged from 1.72 mmol/g in run 1 to 4.75 mmol/g in run 29.

The aliphatic hydroxyl contents of the PL lignin derivatives from each of the twenty nine samples of radiata pine woodchips are shown in Table 4(b). The contents ranged from 2.18 mmol/g in run 1 to 5.09 mmol/g in run 29.

The aliphatic hydroxyl contents of the PL lignin derivatives from each of the thirty samples of loblolly pine chips are shown in Table 4(c). The contents ranged from 1.35 mmol/g in run 1 to 4.39 mmol/g in run 30.

TABLE 4(a)

Organosolv processing conditions for softwood feedstocks.
BC hybrid spruce

| Run # | pH | Acid % | Time min | Temp. °C. | Ethanol % | PL % | OH-pr mmol/g | OH-sec mmol/g | OH-al mmol/g | NRSI |
|---|---|---|---|---|---|---|---|---|---|---|
| 1 | 2.02 | 1.20 | 58 | 191 | 46 | 44.84 | 1.57 | 0.14 | 1.72 | 61.61 |
| 2 | 1.96 | 1.80 | 46 | 187 | 49 | 43.57 | 1.47 | 0.32 | 1.79 | 58.80 |
| 3 | 2.08 | 1.40 | 43 | 189 | 61 | 67.77 | 1.67 | 0.29 | 1.96 | 46.83 |
| 4 | 2.09 | 1.60 | 50 | 183 | 77 | 72.10 | 1.74 | 0.28 | 2.02 | 40.66 |
| 5 | 1.80 | 2.60 | 32 | 182 | 50 | 44.49 | 1.82 | 0.42 | 2.24 | 35.37 |
| 6 | 2.26 | 1.10 | 54 | 185 | 76 | 75.89 | 1.94 | 0.55 | 2.49 | 31.90 |
| 7 | 1.95 | 1.90 | 33 | 179 | 57 | 63.89 | 2.05 | 0.55 | 2.60 | 27.44 |
| 8 | 2.18 | 0.90 | 55 | 184 | 47 | 40.42 | 2.19 | 0.48 | 2.66 | 28.15 |
| 9 | 1.81 | 2.50 | 36 | 175 | 78 | 71.84 | 2.18 | 0.56 | 2.75 | 26.22 |
| 10 | 2.49 | 0.35 | 79 | 198 | 42 | 26.78 | 2.23 | 0.58 | 2.81 | 22.29 |
| 11 | 1.72 | 2.90 | 34 | 168 | 43 | 40.04 | 2.44 | 0.49 | 2.93 | 23.98 |
| 12 | 2.16 | 0.98 | 38 | 178 | 44 | 26.24 | 2.51 | 0.43 | 2.94 | 22.22 |
| 13 | 2.12 | 1.20 | 41 | 181 | 68 | 70.59 | 2.35 | 0.69 | 3.04 | 30.63 |
| 14 | 2.14 | 1.30 | 46 | 175 | 68 | 66.06 | 2.44 | 0.61 | 3.05 | 23.39 |
| 15 | 2.11 | 1.30 | 34 | 172 | 79 | 56.41 | 1.94 | 1.20 | 3.14 | 15.76 |
| 16 | 1.82 | 2.10 | 39 | 170 | 46 | 33.37 | 2.61 | 0.58 | 3.19 | 17.63 |
| 17 | 2.69 | 0.23 | 110 | 191 | 44 | 30.37 | 2.39 | 0.91 | 3.30 | 24.17 |
| 18 | 2.52 | 0.47 | 57 | 194 | 61 | 59.02 | 2.88 | 0.60 | 3.48 | 21.88 |
| 19 | 2.08 | 1.00 | 59 | 171 | 42 | 24.55 | 2.94 | 0.59 | 3.53 | 18.93 |
| 20 | 2.65 | 0.38 | 73 | 189 | 54 | 52.60 | 2.89 | 0.67 | 3.55 | 18.78 |
| 21 | 2.60 | 0.31 | 84 | 184 | 76 | 36.43 | 2.95 | 0.69 | 3.64 | 16.71 |
| 22 | 1.89 | 2.10 | 31 | 167 | 52 | 44.49 | 2.18 | 1.58 | 3.76 | 15.88 |
| 23 | 2.37 | 0.52 | 77 | 178 | 46 | 35.16 | 2.24 | 1.56 | 3.79 | 14.90 |
| 24 | 2.43 | 0.43 | 49 | 179 | 45 | 28.34 | 3.07 | 0.84 | 3.91 | 13.98 |
| 25 | 2.66 | 0.36 | 61 | 188 | 67 | 54.42 | 3.23 | 0.70 | 3.93 | 18.54 |
| 26 | 2.42 | 0.64 | 51 | 176 | 65 | 64.03 | 2.38 | 1.66 | 4.04 | 15.15 |
| 27 | 3.15 | 0.13 | 53 | 199 | 73 | 24.55 | 2.85 | 1.19 | 4.04 | 16.90 |
| 28 | 3.02 | 0.12 | 86 | 186 | 47 | 30.28 | 3.14 | 1.39 | 4.53 | 22.32 |
| 29 | 2.88 | 0.17 | 60 | 182 | 62 | 29.21 | 3.34 | 1.40 | 4.75 | 13.27 |

TABLE 3(b)

Chilean radiata pine

| Run # | pH | Acid % | Time min | Temp. °C. | Ethanol % | PL % | OH-pr mmol/g | OH-sec mmol/g | OH-al mmol/g | NRSI |
|---|---|---|---|---|---|---|---|---|---|---|
| 1 | 2.04 | 1.20 | 58 | 191 | 46 | 34.21 | 1.74 | 0.44 | 2.18 | 64.24 |
| 2 | 2.06 | 1.60 | 50 | 183 | 77 | 65.00 | 1.77 | 0.42 | 2.19 | 36.10 |
| 3 | 1.72 | 2.60 | 32 | 182 | 50 | 46.46 | 1.79 | 0.41 | 2.20 | 42.49 |
| 4 | 2.12 | 1.40 | 43 | 189 | 61 | 65.40 | 1.79 | 0.43 | 2.22 | 35.27 |
| 5 | 1.86 | 2.50 | 36 | 175 | 78 | 59.66 | 1.87 | 0.36 | 2.23 | 33.71 |
| 6 | 1.92 | 1.80 | 46 | 187 | 49 | 42.72 | 1.90 | 0.35 | 2.26 | 37.44 |
| 7 | 1.92 | 1.90 | 33 | 179 | 57 | 48.76 | 2.31 | 0.49 | 2.80 | 36.98 |
| 8 | 2.28 | 1.10 | 54 | 185 | 76 | 79.49 | 2.17 | 0.72 | 2.90 | 49.41 |
| 9 | 2.50 | 0.35 | 79 | 198 | 42 | 31.87 | 2.36 | 0.71 | 3.07 | 35.93 |
| 10 | 1.73 | 2.90 | 34 | 168 | 43 | 29.72 | 2.45 | 0.65 | 3.10 | 22.44 |
| 11 | 2.08 | 0.98 | 38 | 178 | 44 | 28.17 | 2.65 | 0.63 | 3.27 | 20.83 |
| 12 | 2.23 | 0.90 | 55 | 184 | 47 | 38.00 | 2.62 | 0.69 | 3.31 | 28.27 |
| 13 | 2.12 | 1.30 | 46 | 175 | 68 | 82.49 | 2.87 | 0.72 | 3.59 | 23.29 |
| 14 | 2.15 | 1.20 | 41 | 181 | 68 | 60.93 | 2.75 | 0.85 | 3.60 | 30.02 |
| 15 | 2.50 | 0.47 | 57 | 194 | 61 | 48.55 | 2.94 | 0.72 | 3.66 | 27.20 |
| 16 | 1.80 | 2.10 | 39 | 170 | 46 | 31.81 | 3.01 | 0.70 | 3.71 | 18.71 |
| 17 | 2.06 | 1.00 | 59 | 171 | 42 | 22.85 | 3.00 | 0.71 | 3.72 | 20.93 |
| 18 | 2.70 | 0.31 | 84 | 184 | 76 | 33.09 | 3.02 | 0.72 | 3.73 | 20.78 |
| 19 | 2.38 | 0.52 | 77 | 178 | 46 | 29.70 | 3.05 | 0.71 | 3.77 | 18.00 |
| 20 | 2.63 | 0.23 | 110 | 191 | 44 | 27.01 | 2.72 | 1.06 | 3.78 | 29.76 |
| 21 | 2.52 | 0.38 | 73 | 189 | 54 | 31.35 | 3.18 | 0.72 | 3.90 | 16.80 |
| 22 | 1.79 | 2.10 | 31 | 167 | 52 | 37.58 | 3.25 | 0.68 | 3.92 | 16.15 |
| 23 | 2.73 | 0.36 | 61 | 188 | 67 | 46.40 | 3.23 | 0.72 | 3.95 | 13.90 |
| 24 | 2.04 | 1.30 | 34 | 172 | 79 | 50.87 | 3.32 | 0.70 | 4.02 | 17.61 |
| 25 | 2.30 | 0.64 | 51 | 176 | 65 | 57.35 | 3.62 | 0.72 | 4.35 | 14.63 |
| 26 | 3.08 | 0.13 | 53 | 199 | 73 | 22.04 | 3.12 | 1.35 | 4.47 | 18.15 |
| 27 | 2.50 | 0.43 | 49 | 179 | 45 | 25.33 | 3.09 | 1.54 | 4.63 | 14.24 |
| 28 | 2.95 | 0.12 | 86 | 186 | 47 | 28.54 | 3.23 | 1.54 | 4.77 | 19.76 |
| 29 | 3.01 | 0.17 | 60 | 182 | 62 | 22.12 | 3.55 | 1.53 | 5.09 | 13.68 |

TABLE 3(c)

Southeastern US loblolly pine

| Run # | pH | Acid % | Time min | Temp. °C. | Ethanol % | PL % | OH-pr mmol/g | OH-sec mmol/g | OH-al mmol/g | NRSI |
|---|---|---|---|---|---|---|---|---|---|---|
| 1 | 2.05 | 1.20 | 33 | 192 | 82 | 65.1 | 1.16 | 0.19 | 1.35 | 48.73 |
| 2 | 2.12 | 1.20 | 58 | 191 | 46 | 36.9 | 1.42 | 0.03 | 1.42 | 55.39 |
| 3 | 2.00 | 1.60 | 50 | 183 | 77 | 69.1 | 1.42 | 0.03 | 1.43 | 44.54 |
| 4 | 2.01 | 1.40 | 43 | 189 | 61 | 63.3 | 1.55 | 0.03 | 1.58 | 46.95 |
| 5 | 1.65 | 2.60 | 32 | 182 | 50 | 41.6 | 1.74 | 0.00 | 1.74 | 47.49 |
| 6 | 2.13 | 1.10 | 54 | 185 | 76 | 69.9 | 1.29 | 0.58 | 1.87 | 31.66 |
| 7 | 1.80 | 1.80 | 46 | 187 | 49 | 42.3 | 1.74 | 0.13 | 1.87 | 53.44 |
| 8 | 2.02 | 1.20 | 41 | 181 | 68 | 58.0 | 1.68 | 0.26 | 1.94 | 32.17 |
| 9 | 1.90 | 2.50 | 36 | 175 | 78 | 66.8 | 1.68 | 0.26 | 1.94 | 32.73 |
| 10 | 2.33 | 0.90 | 55 | 184 | 47 | 36.0 | 1.87 | 0.26 | 2.13 | 34.41 |
| 11 | 2.07 | 1.70 | 43 | 176 | 81 | 62.1 | 1.94 | 0.39 | 2.32 | 31.29 |
| 12 | 1.90 | 1.90 | 33 | 179 | 57 | 53.1 | 2.06 | 0.45 | 2.52 | 24.37 |
| 13 | 1.83 | 2.10 | 39 | 170 | 46 | 29.8 | 2.19 | 0.45 | 2.65 | 27.78 |
| 14 | 2.10 | 1.30 | 34 | 172 | 79 | 50.2 | 2.32 | 0.45 | 2.77 | 20.05 |
| 15 | 1.80 | 2.90 | 34 | 168 | 43 | 25.3 | 2.26 | 0.52 | 2.77 | 33.44 |
| 16 | 2.17 | 1.30 | 46 | 175 | 68 | 58.9 | 2.26 | 0.58 | 2.84 | 27.85 |
| 17 | 2.52 | 0.35 | 79 | 198 | 42 | 16.4 | 2.19 | 0.71 | 2.90 | 27.95 |
| 18 | 2.58 | 0.64 | 51 | 176 | 65 | 48.7 | 2.13 | 0.77 | 2.90 | 13.78 |
| 19 | 2.15 | 1.00 | 59 | 171 | 42 | 20.5 | 2.32 | 0.58 | 2.90 | 23.61 |
| 20 | 2.25 | 0.98 | 38 | 178 | 44 | 38.5 | 2.45 | 0.52 | 2.97 | 23.34 |
| 21 | 1.87 | 2.10 | 31 | 167 | 52 | 39.0 | 2.58 | 0.52 | 3.10 | 19.27 |
| 22 | 2.65 | 0.31 | 84 | 184 | 76 | 34.1 | 2.52 | 0.65 | 3.16 | 19.24 |
| 23 | 2.47 | 0.47 | 57 | 194 | 61 | 46.9 | 2.39 | 0.77 | 3.16 | 26.27 |
| 24 | 2.92 | 0.17 | 60 | 182 | 62 | 38.5 | 2.65 | 0.65 | 3.29 | 15.93 |
| 25 | 2.50 | 0.38 | 73 | 189 | 54 | 39.3 | 2.58 | 0.84 | 3.42 | 27.78 |
| 26 | 2.39 | 0.43 | 49 | 179 | 45 | 30.7 | 2.65 | 0.84 | 3.48 | 18.02 |
| 27 | 2.77 | 0.23 | 110 | 191 | 44 | 12.5 | 2.52 | 1.03 | 3.55 | 22.80 |
| 28 | 3.20 | 0.13 | 53 | 199 | 73 | 23.3 | 2.65 | 1.16 | 3.81 | 24.56 |
| 29 | 2.80 | 0.36 | 61 | 188 | 67 | 24.8 | 2.97 | 1.29 | 4.26 | 17.00 |
| 30 | 2.99 | 0.12 | 86 | 186 | 47 | 27.9 | 2.97 | 1.42 | 4.39 | 18.12 |

Characterization of the NRSI of Derivatives of Native Lignin Recovered from Three Species of Softwoods.

Each of the lignin derivative subsamples produced above were assessed for its radical scavenging index (RSI). The potential antioxidant activity of each PL lignin derivative was determined as described above. The NRSI values for lignin derivatives recovered from hybrid spruce biomass are shown in Table 4(a). The NRSI values for lignin derivatives recovered from radiate pine biomass are shown in Table 4(b). The NRSI values for lignin derivatives recovered from loblolly pine biomass are shown in Table 4(c).

EXAMPLE 3

Recovery of Derivatives of Native Lignin from Three Annual Fibre Feedstocks

Three annual fibre feedstocks were prepared from: (1) wheat straw from Alberta Canada, (2) sugarcane bagasse from Brazil, and (3) corn cobs from crops produced in Europe. Subsamples of the three plant species were individually pulped using an autocatalysed ethanol pulping process based on the Alcell® organosolv process wherein a different set of pulping conditions was used for each subsample.

The individual sets of pulping conditions applied to annual fiber feedstocks are listed in Tables 5(a)-5(c). Twenty seven different combinations of pulping conditions were tested with each of Alberta wheat straw (Table 5(a)) and European corn cobs (Table 5(c)), and twenty six combinations were tested with Brazilian sugarcane bagasse (Table 5(b)).

For each subsample, the ethanol pulping solvent was prepared as listed in its respective table. First, the ethanol was partially diluted with water after which, a suitable amount of sulphuric acid was added to achieve the target final acidity after which, the ethanol solution was further diluted with water to achieve the target ethanol concentration.

The raw lignin content of each fibrous biomass subsample was determined using the Klason lignin determination method. Then, after adding the fibrous biomass subsample to a pressure vessel (100-700 g odw chips), the tailored ethanol-based pulping solvent was added to the vessel (6:1 liquor:wood ratio) after which it was brought up to the target temperature and pressure listed in the table. The biomass subsample was then "cooked" for the specified period of time after which, the pulping process was stopped. After pulping, the derivatives of native lignin were recovered by transferring the contents of pressure vessel to a press. The solids were then squeezed in a press and filtered through a coarse silk screen which separated the chip residues from the fine particles and the liquids. Next, the fine particles were separated from the liquids by filtering the suspension separated from the chip residues, through fine filter paper. The fine particles represent derivatives of native lignin that were extracted and which precipitated from solution after cooling and is herein referred to as self-precipitated derivatives of native lignin designated in the tables as "SPL". Finally, the derivatives of native lignin still remaining in the filtered liquid were precipitated from solution by dilution with cold water. The derivatives of native lignin precipitated by cold-water dilution are referred to herein as precipitated lignin or "PL". After determination of the dry weights of SPL and PL derivatives of native lignin, the relative yield of each lignin derivative was determined in reference to the Klason lignin value determined for the biomass sample before pulping. The yields of SPL and PL derivatives of native lignin for each subsample are expressed on a weight % basis relative to its total lignin value, and listed in Tables 5(a)-5(c) for the annual fibre feedstocks in columns next to the processing conditions used for each subsamples.

The chip residues remaining after the first filtering step were pressed, dried and weighed. The yield of de-lignified residues, referred to in Tables 5(a)-5(c) as "PBY", are expressed on a % yield basis relative to the dry weight of the pre-pulping biomass subsample.

Characterization of the Aliphatic Hydroxyl Content of Derivatives of Native Lignin Recovered from Three Species of Annual Fibre Feedstocks.

Derivatives of native lignin recovered from annual fiber feedstocks were analyzed as described above to determine mmol primary hydroxyl groups/g sample (OH-pr mmol/g) and mmol secondary hydroxyl groups/g sample (OH-sec mmol/g). These data were then used to calculate mmol aliphatic hydroxyl groups/g sample (OH-al mmol/g)

The aliphatic hydroxyl contents of the PL lignin derivatives from each of the twenty seven samples of wheat straw biomass are shown in Table 5(a). The contents ranged from 2.03 mmol/g in 2.03 run 1 to 3.59 mmol/g in run 27.

The aliphatic hydroxyl contents of the PL lignin derivatives from each of the twenty six samples of sugarcane bagasse biomass are shown in Table 5(b). The contents ranged from 1.72 mmol/g in run 1 to 3.70 mmol/g in run 26.

The aliphatic hydroxyl contents of the PL lignin derivatives from each of the twenty seven samples of corn cob biomass are shown in Table 5(c). The contents ranged from 1.58 mmol/g in run 1 to 4.59 mmol/g in run 27.

TABLE 5(a)

Organosolv processing conditions for annual fibre feedstocks.
Alberta wheat straw

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 1 | 2.86 | 90 | 195 | 41 | 38.17 | 1.20 | 0.82 | 2.03 | 54.02 |
| 2 | 2.15 | 39 | 189 | 50 | 47.53 | 1.31 | 1.15 | 2.46 | 44.71 |
| 3 | 2.26 | 49 | 192 | 37 | 37.01 | 1.36 | 1.10 | 2.47 | 55.32 |
| 4 | 2.23 | 100 | 190 | 67 | 56.88 | 1.53 | 0.96 | 2.49 | 55.76 |
| 5 | 1.80 | 42 | 179 | 51 | 52.09 | 1.66 | 0.89 | 2.55 | 34.17 |
| 6 | 2.09 | 32 | 187 | 69 | 49.66 | 1.59 | 0.97 | 2.56 | 37.02 |
| 7 | 2.07 | 67 | 189 | 51 | 54.08 | 1.52 | 1.05 | 2.58 | 52.10 |
| 8 | 1.85 | 70 | 185 | 47 | 47.92 | 1.59 | 0.99 | 2.58 | 43.22 |
| 9 | 1.96 | 56 | 175 | 68 | 53.59 | 1.74 | 0.87 | 2.60 | 35.85 |
| 10 | 2.21 | 87 | 181 | 66 | 46.06 | 1.62 | 1.19 | 2.81 | 36.46 |
| 11 | 2.24 | 48 | 184 | 65 | 43.48 | 1.67 | 1.15 | 2.82 | 36.63 |
| 12 | 1.76 | 37 | 180 | 36 | 24.73 | 1.75 | 1.10 | 2.84 | 41.10 |
| 13 | 2.03 | 66 | 166 | 71 | 46.36 | 1.77 | 1.08 | 2.85 | 27.90 |
| 14 | 2.10 | 106 | 176 | 38 | 35.07 | 1.61 | 1.25 | 2.86 | 45.20 |
| 15 | 2.34 | 99 | 183 | 54 | 53.25 | 1.71 | 1.19 | 2.90 | 40.66 |
| 16 | 2.49 | 53 | 185 | 72 | 30.91 | 1.69 | 1.34 | 3.03 | 35.02 |
| 17 | 2.59 | 27 | 163 | 63 | 19.82 | 1.29 | 1.75 | 3.05 | 25.41 |
| 18 | 2.40 | 94 | 178 | 61 | 36.39 | 1.64 | 1.42 | 3.06 | 39.29 |
| 19 | 2.03 | 77 | 176 | 42 | 40.81 | 1.66 | 1.42 | 3.08 | 42.17 |
| 20 | 2.20 | 64 | 165 | 65 | 23.88 | 1.69 | 1.47 | 3.16 | 30.85 |
| 21 | 1.97 | 93 | 165 | 40 | 31.81 | 1.69 | 1.47 | 3.16 | 40.17 |
| 22 | 2.65 | 59 | 182 | 45 | 25.31 | 1.67 | 1.52 | 3.19 | 29.68 |
| 23 | 2.61 | 72 | 162 | 70 | 19.08 | 1.55 | 1.64 | 3.19 | 24.37 |
| 24 | 2.67 | 74 | 175 | 53 | 9.24 | 1.72 | 1.48 | 3.19 | 29.51 |
| 25 | 2.21 | 48 | 174 | 57 | 9.82 | 1.65 | 1.65 | 3.30 | 27.51 |
| 26 | 2.45 | 79 | 178 | 49 | 39.27 | 1.80 | 1.56 | 3.36 | 36.83 |
| 27 | 2.12 | 62 | 172 | 35 | 20.65 | 1.66 | 1.93 | 3.59 | 24.59 |

TABLE 5(b)

Brazilian sugarcane bagasse

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 1 | 2.08 | 48 | 184 | 65 | 45.13 | 0.93 | 0.79 | 1.72 | 35.80 |
| 2 | 2.19 | 61 | 178 | 66 | 49.76 | 1.02 | 0.73 | 1.74 | 52.34 |
| 3 | 2.36 | 34 | 180 | 45 | 44.27 | 0.99 | 0.99 | 1.99 | 49.32 |
| 4 | 2.01 | 23 | 170 | 66 | 39.56 | 1.19 | 0.89 | 2.09 | 41.80 |
| 5 | 2.43 | 79 | 178 | 49 | 40.84 | 1.57 | 0.60 | 2.17 | 40.56 |
| 6 | 2.44 | 50 | 192 | 43 | 37.36 | 1.02 | 1.17 | 2.20 | 46.90 |
| 7 | 2.50 | 26 | 183 | 71 | 45.82 | 1.66 | 0.58 | 2.24 | 32.49 |
| 8 | 2.06 | 47 | 176 | 38 | 34.11 | 1.15 | 1.15 | 2.30 | 50.07 |
| 9 | 2.19 | 54 | 164 | 58 | 44.95 | 1.31 | 1.02 | 2.34 | 38.73 |
| 10 | 2.51 | 78 | 166 | 62 | 44.94 | 1.28 | 1.05 | 2.34 | 42.49 |
| 11 | 2.10 | 28 | 171 | 46 | 43.75 | 1.36 | 1.13 | 2.49 | 48.63 |
| 12 | 2.08 | 44 | 161 | 52 | 44.20 | 1.43 | 1.07 | 2.50 | 38.93 |
| 13 | 2.93 | 69 | 184 | 42 | 30.26 | 1.47 | 1.05 | 2.51 | 37.80 |
| 14 | 2.77 | 95 | 168 | 53 | 39.46 | 1.64 | 1.00 | 2.64 | 34.10 |
| 15 | 2.68 | 57 | 188 | 63 | 47.51 | 1.74 | 1.02 | 2.76 | 29.49 |
| 16 | 2.37 | 52 | 172 | 50 | 42.06 | 1.91 | 0.85 | 2.76 | 33.41 |
| 17 | 2.38 | 42 | 173 | 60 | 43.37 | 1.70 | 1.06 | 2.76 | 30.85 |
| 18 | 2.41 | 68 | 162 | 47 | 35.99 | 1.79 | 1.00 | 2.79 | 34.71 |

TABLE 5(b)-continued

Brazilian sugarcane bagasse

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 19 | 2.84 | 98 | 174 | 37 | 24.45 | 1.31 | 1.52 | 2.83 | 41.37 |
| 20 | 2.91 | 59 | 182 | 39 | 28.67 | 1.59 | 1.28 | 2.87 | 42.05 |
| 21 | 3.26 | 32 | 197 | 51 | 42.14 | 1.53 | 1.39 | 2.92 | 39.05 |
| 22 | 2.92 | 88 | 171 | 73 | 8.67 | 1.51 | 1.51 | 3.02 | 24.49 |
| 23 | 3.19 | 81 | 181 | 57 | 31.83 | 1.50 | 1.69 | 3.19 | 25.37 |
| 24 | 2.63 | 72 | 162 | 70 | 32.48 | 1.79 | 1.48 | 3.26 | 22.37 |
| 25 | 2.55 | 27 | 163 | 63 | 43.46 | 2.05 | 1.28 | 3.33 | 22.85 |
| 26 | 2.75 | 37 | 167 | 40 | 21.56 | 1.31 | 2.39 | 3.70 | 24.20 |

TABLE 5(c)

European corn cobs

| Run # | pH | Time min | Temp. °C. | Ethanol % | PL % | OH-pr mmol/g | OH-sec mmol/g | OH-al mmol/g | NRSI |
|---|---|---|---|---|---|---|---|---|---|
| 1 | 2.18 | 100 | 190 | 67 | 56.58 | 0.95 | 0.63 | 1.58 | 45.15 |
| 2 | 1.76 | 37 | 180 | 36 | 33.32 | 0.66 | 0.98 | 1.64 | 45.32 |
| 3 | 1.85 | 42 | 179 | 51 | 52.34 | 0.71 | 1.03 | 1.73 | 52.54 |
| 4 | 1.93 | 70 | 185 | 47 | 49.02 | 0.65 | 1.16 | 1.81 | 43.90 |
| 5 | 2.10 | 67 | 189 | 51 | 52.01 | 0.64 | 1.22 | 1.86 | 45.98 |
| 6 | 1.89 | 56 | 175 | 68 | 49.73 | 0.56 | 1.31 | 1.87 | 39.29 |
| 7 | 2.21 | 48 | 184 | 65 | 49.62 | 0.50 | 1.62 | 2.12 | 40.34 |
| 8 | 2.33 | 49 | 192 | 37 | 29.35 | 1.49 | 0.65 | 2.14 | 53.29 |
| 9 | 1.98 | 66 | 166 | 71 | 47.93 | 0.68 | 1.48 | 2.15 | 39.88 |
| 10 | 2.04 | 32 | 187 | 69 | 45.27 | 0.74 | 1.42 | 2.16 | 38.37 |
| 11 | 2.14 | 87 | 181 | 66 | 52.93 | 0.69 | 1.50 | 2.19 | 43.54 |
| 12 | 1.93 | 93 | 165 | 40 | 35.49 | 1.58 | 0.76 | 2.34 | 32.56 |
| 13 | 2.17 | 99 | 183 | 54 | 50.71 | 1.24 | 1.11 | 2.35 | 49.00 |
| 14 | 2.11 | 106 | 176 | 38 | 32.28 | 0.82 | 1.58 | 2.39 | 42.20 |
| 15 | 2.18 | 53 | 185 | 72 | 42.72 | 0.60 | 1.81 | 2.41 | 31.73 |
| 16 | 2.00 | 77 | 176 | 42 | 38.75 | 0.81 | 1.61 | 2.42 | 40.61 |
| 17 | 2.54 | 72 | 162 | 70 | 20.05 | 0.75 | 1.74 | 2.49 | 26.80 |
| 18 | 2.81 | 61 | 178 | 66 | 31.52 | 0.89 | 1.66 | 2.55 | 36.15 |
| 19 | 2.53 | 27 | 163 | 63 | 18.86 | 0.83 | 1.77 | 2.61 | 24.98 |
| 20 | 2.09 | 48 | 174 | 57 | 47.17 | 0.61 | 2.01 | 2.63 | 35.41 |
| 21 | 2.36 | 79 | 178 | 49 | 45.43 | 1.29 | 1.41 | 2.69 | 44.17 |
| 22 | 2.28 | 64 | 165 | 65 | 41.20 | 0.69 | 2.01 | 2.69 | 29.68 |
| 23 | 2.31 | 94 | 178 | 61 | 47.72 | 0.80 | 1.97 | 2.77 | 38.29 |
| 24 | 2.42 | 79 | 169 | 59 | 27.61 | 1.21 | 1.59 | 2.80 | 26.24 |
| 25 | 2.19 | 39 | 189 | 50 | 47.01 | 1.85 | 0.99 | 2.84 | 47.24 |
| 26 | 2.50 | 59 | 182 | 45 | 37.77 | 1.37 | 1.79 | 3.16 | 51.41 |
| 27 | 1.90 | 62 | 172 | 35 | 23.86 | 2.29 | 2.29 | 4.59 | 43.98 |

Characterization of the RSI of Derivatives of Native Lignin Recovered from Three Species of Annual Fibre Feedstocks.

Each of the lignin derivative subsamples produced above was assessed for its radical scavenging index (RSI). The potential antioxidant activity of each PL lignin derivative was determined by measuring its radical savaging capacity as described above.

The NRSI values for lignin derivatives recovered from wheat straw biomass are shown in Table 5(a). The NRSI values for lignin derivatives recovered from sugarcane bagasse biomass are shown in Table 5(b). The NRSI values for lignin derivatives recovered from corn cob biomass are shown in Table 5(c).

EXAMPLE 4

Predictive Equations for Selective Recovery of Lignin Derivatives Having Targeted Aliphatic Hydroxyl Contents, from Organosolv Pulping of Hardwood Biomass Feedstocks BC Aspen:

In reference to the operating conditions for the twenty seven preliminary organosolv pulping runs with subsamples of aspen shown in Table 1(a), the intervals used for model generation were: (a) pH=[1.64, 3.30]; (b) Ethanol concentration in the organic solvent (% w/w)=[41,79]; (c) pulping time duration (min)=[21, 115]; and (d) pulping temperature (° C.)=[166, 205].

The equation derived from the aliphatic hydroxyl data shown in Table 1(a) for selection of two or more operating conditions for production of lignin derivatives having an aliphatic hydroxyl content from the range of about 0.48 mmol/g to about 4.94 mmol/g, is:

$$13.9417 - 0.0764507*Temperature - 0.20763*Ethanol + 0.566778*pH*pH - 0.00303132*pH*Time + 0.00106268*Temperature*Ethanol \qquad \text{EQ 1}$$

FIG. 1 shows aliphatic hydroxyl contents of lignin derivatives recovered from aspen as a function of organic solvent concentration [Ethanol] and pulping temperature [Temperature] at constant pH of 2.47 and pulping time of 68 min., and shows process conditions suitable for producing lignin derivatives of the present disclosures have either decreased or increased aliphatic hydroxyl contents.

Chilean *Acacia*:

In reference to the operating conditions for the twenty seven preliminary organosolv pulping runs with subsamples of acacia shown in Table 1(b), the intervals used for model generation were: (a) pH=[1.79, 3.20]; (b) Ethanol concentration in the organic solvent (% w/w)=[41,79]; (c) pulping time duration (min)=[21, 115]; and (d) pulping temperature (° C.)=[166, 205].

The equation derived from the aliphatic hydroxyl data shown in Table 1(a) for selection of two or more operating conditions for production of lignin derivatives having an aliphatic hydroxyl content from the range of about 0.68 mmol/g to about 7.28 mmol/g, is:

$$44.4758-17.3944*pH-0.342106*Temperature+$$
$$0.373582*Ethanol-0.0133583*pH*Time+$$
$$0.124198*pH*Temperature+$$
$$0.000205204*Time*Time-$$
$$0.00333743*Ethanol*Ethanol \quad \text{EQ 2}$$

Figure 2:
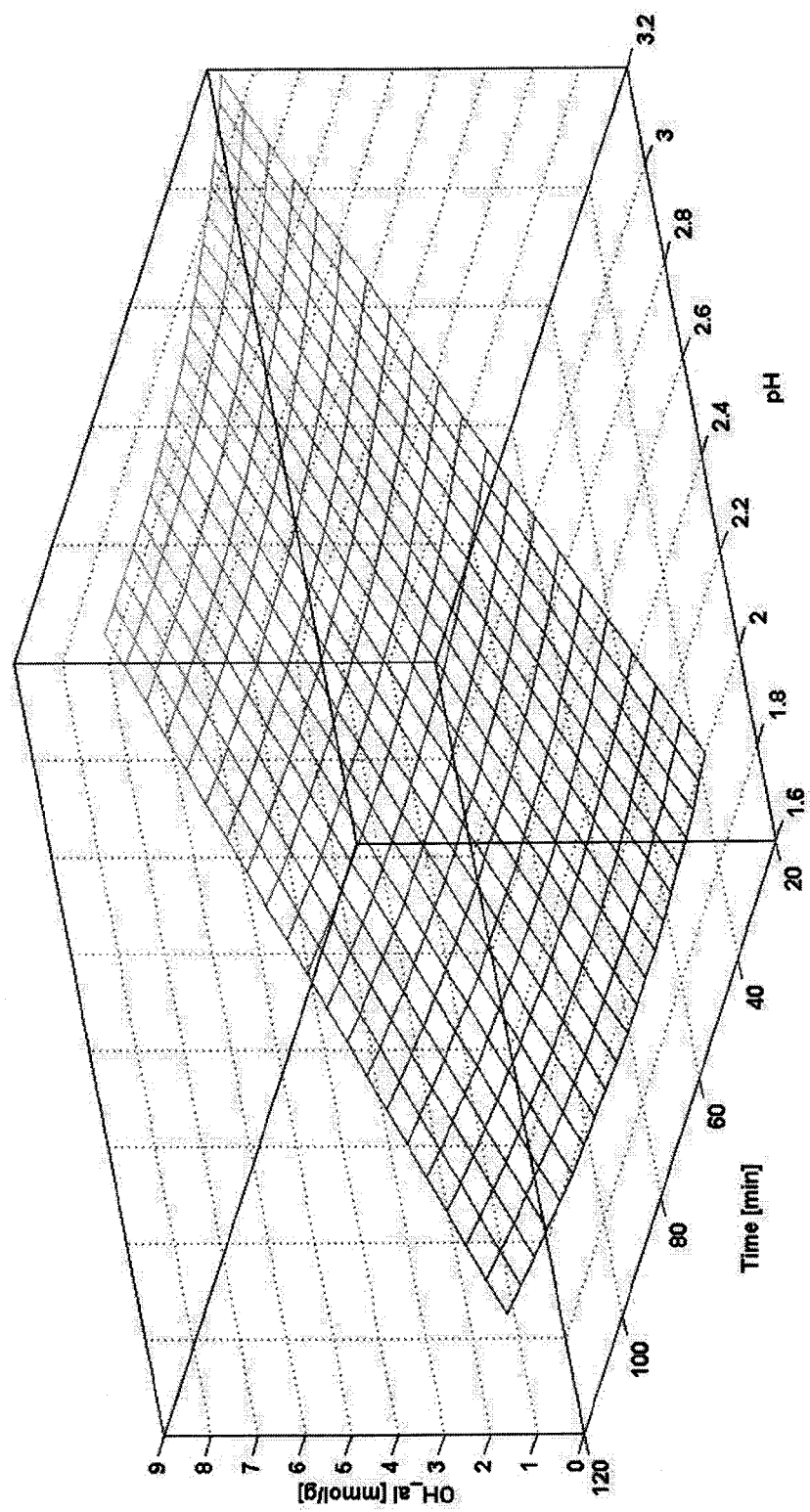
FIG. 2 is a chart showing aliphatic hydroxyl contents of lignin derivatives of the present disclosure recovered from acacia as a function of pulping time [time] and acidification of the organic solvent [pH] at constant organic solvent concentration of 60.0% (w/w) and pulping temperature of 185.5° C.

FIG. 2 shows aliphatic hydroxyl contents of lignin derivatives recovered from acacia as a function of pulping time [time] and acidification of the organic solvent [pH] at constant organic solvent concentration of 60.0% (w/w) and pulping temperature of 185.5° C., and shows process conditions suitable for producing lignin derivatives of the present disclosures having either decreased or increased aliphatic hydroxyl contents.

Chilean *Eucalyptus*:

In reference to the operating conditions for the twenty seven preliminary organosolv pulping runs with subsamples of eucalyptus shown in Table 1(c), the intervals used for model generation were: (a) pH=[1.65, 3.22]; (b) Ethanol concentration in the organic solvent (% w/w)=[41,79]; (c) pulping time duration (min)=[21, 115]; and (d) pulping temperature (° C.)=[166, 205].

The equation derived from the aliphatic hydroxyl data shown in Table 1(a) for selection of two or more operating conditions for production of lignin derivatives having an aliphatic hydroxyl content from the range of about 0.63 mmol/g to about 6.07 mmol/g, is:

$$42.1508+4.21822*pH-0.5579848Temperature+$$
$$0.352034*Ethanol-0.0197431*pH*Time+$$
$$0.000758397*Time*Ethanol+$$
$$0.00148659*Temperature*Temperature-$$
$$0.000837671*Temperature*Ethanol-$$
$$0.00251297*Ethanol*Ethanol \quad \text{EQ 3}$$

Figure 3:
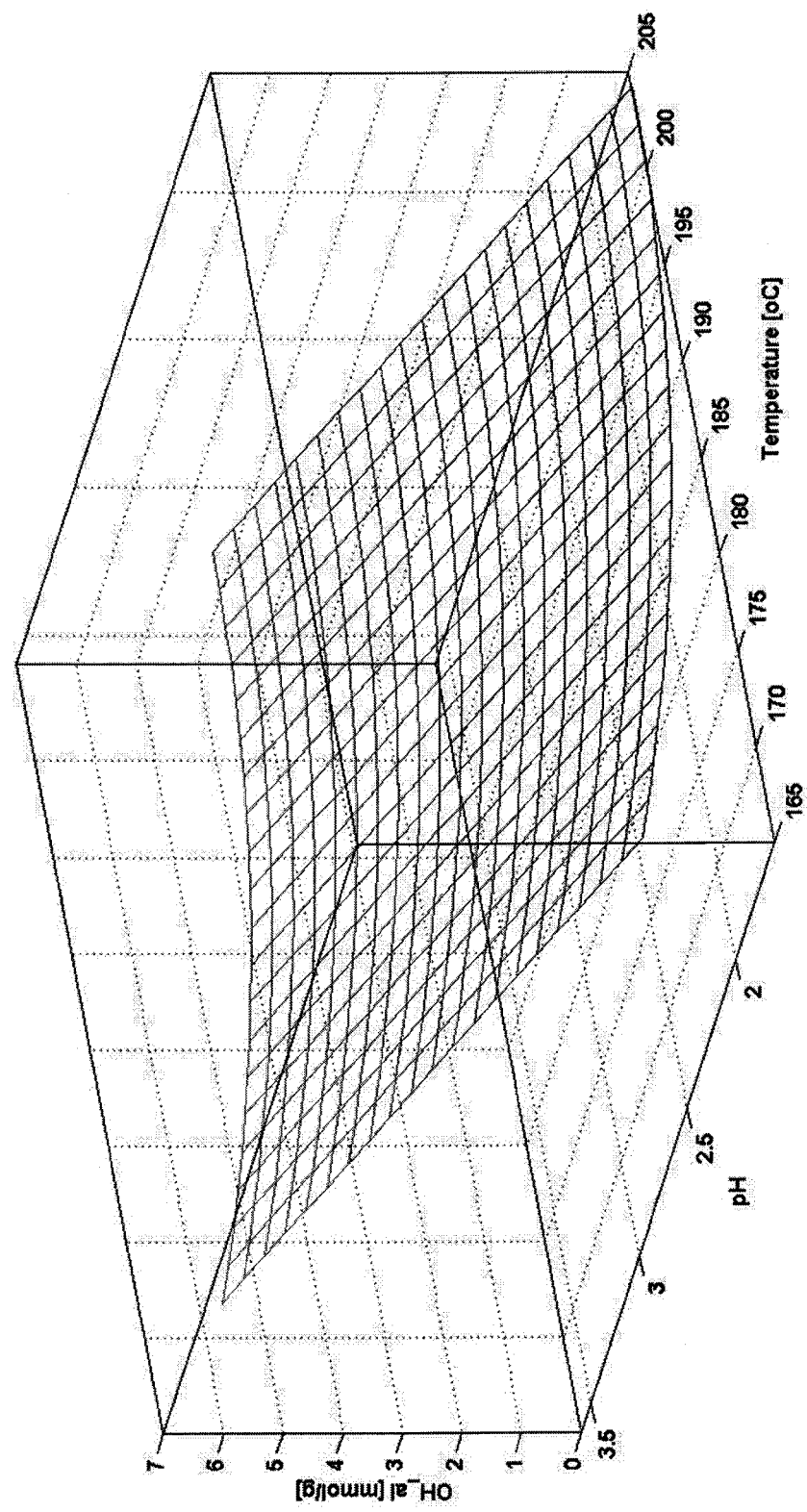
FIG. 3 is a chart showing aliphatic hydroxyl contents of lignin derivatives of the present disclosure recovered from eucalyptus as a function of acidification of the organic solvent [pH] and pulping temperature [Temperature] at constant organic solvent concentration of 60.0% (w/w) and pulping time of 68 min.

FIG. 3 shows aliphatic hydroxyl contents of lignin derivatives recovered from eucalyptus as a function of acidification of the organic solvent [pH] and pulping temperature [Temperature] at constant organic solvent concentration of 60.0% (w/w) and pulping time of 68 min, and shows process conditions suitable for producing lignin derivatives of the present disclosures having either decreased or increased aliphatic hydroxyl contents.

EXAMPLE 5

Predictive Equations for Selective Recovery of Lignin Derivatives Having Targeted Aliphatic Hydroxyl Contents, from Organosolv Pulping of Softwood Biomass Feedstocks BC Hybrid Spruce:

In reference to the operating conditions for the twenty seven preliminary organosolv pulping runs with subsamples of hybrid spruce shown in Table 4(a), the intervals used for model generation were: (a) pH=[1.72, 3.15]; (b) Ethanol concentration in the organic solvent (% w/w)=[42,79]; (c) pulping time duration (min)=[31, 110]; and (d) pulping temperature (° C.)=[167, 199].

The equation derived from the aliphatic hydroxyl data shown in Table 4(a) for selection of two or more operating conditions for production of lignin derivatives having an aliphatic hydroxyl content of about 5.23 mmol/g or less, is:

$$65.2341-0.689028*Temperature+0.170969*Ethanol+$$
$$0.0217104*pH*Temperature-$$
$$0.0267202*pH*Ethanol-$$
$$0.000116382*Time*Temperature+$$
$$0.000382542*Time*Ethanol+$$
$$0.00156337*Temperature*Temperature-$$
$$0.00113549+Ethanol*Ethanol \quad \text{EQ 4}$$

Figure 4:
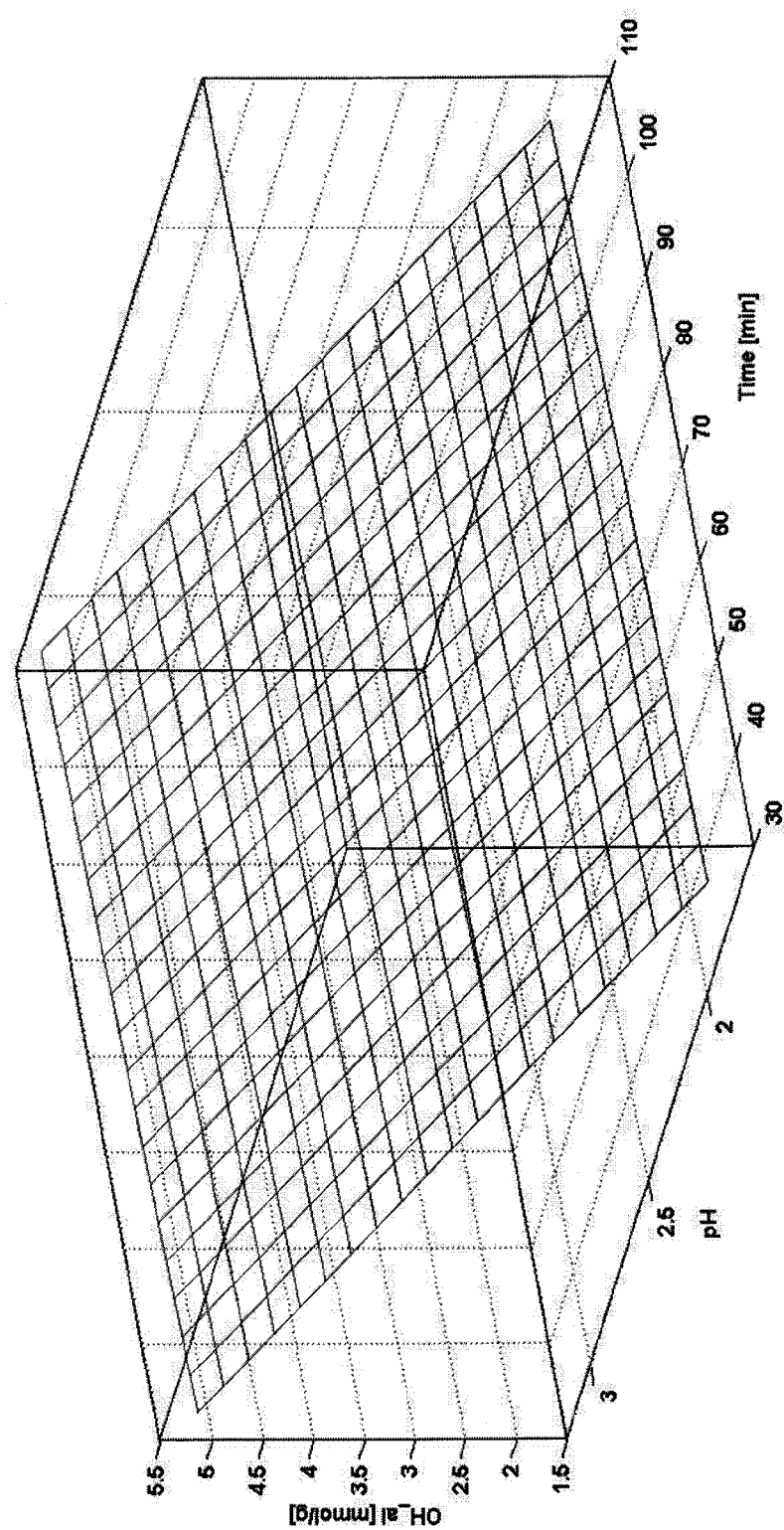
FIG. 4 is a chart showing aliphatic hydroxyl contents of lignin derivatives of the present disclosure recovered from hybrid spruce as a function of acidification of the organic solvent [pH] and pulping time [Time] at constant organic solvent concentration of 60.5% (w/w) and pulping temperature of 183° C.

FIG. 4 shows aliphatic hydroxyl contents of lignin derivatives recovered from hybrid spruce as a function of acidification of the organic solvent [pH] and pulping time [Time] at constant organic solvent concentration of 60.5% (w/w) and pulping temperature of 183° C. and shows process conditions suitable for producing lignin derivatives of the present disclosures having either decreased or increased aliphatic hydroxyl contents.

Chilean Radiata Pine:

In reference to the operating conditions for the twenty seven preliminary organosolv pulping runs with subsamples of radiata pine shown in Table 4(b), the intervals used for model generation were: (a) pH=[1.72, 3.08]; (b) Ethanol concentration in the organic solvent (% w/w)=[42,79]; (c) pulping time duration (min)=[31, 110]; and (d) pulping temperature (° C.)=[167, 199].

The equation derived from the aliphatic hydroxyl data shown in Table 4(b) for selection of two or more operating conditions for production of lignin derivatives having an aliphatic hydroxyl content of about 1.96 mmol/g to about 5.60 mmol/g, is:

$$13.9072-0.103563*Temperature+0.124245*Ethanol-$$
$$1.31731*pH*pH+0.0386197*pH*Temperature+$$
$$0.040326*pH*Ethanol+$$
$$0.000100503*Time*Time-$$
$$0.000526035*Time*Ethanol-$$
$$0.00112536*Temperature*Ethanol \quad \text{EQ 5}$$

Figure 5:
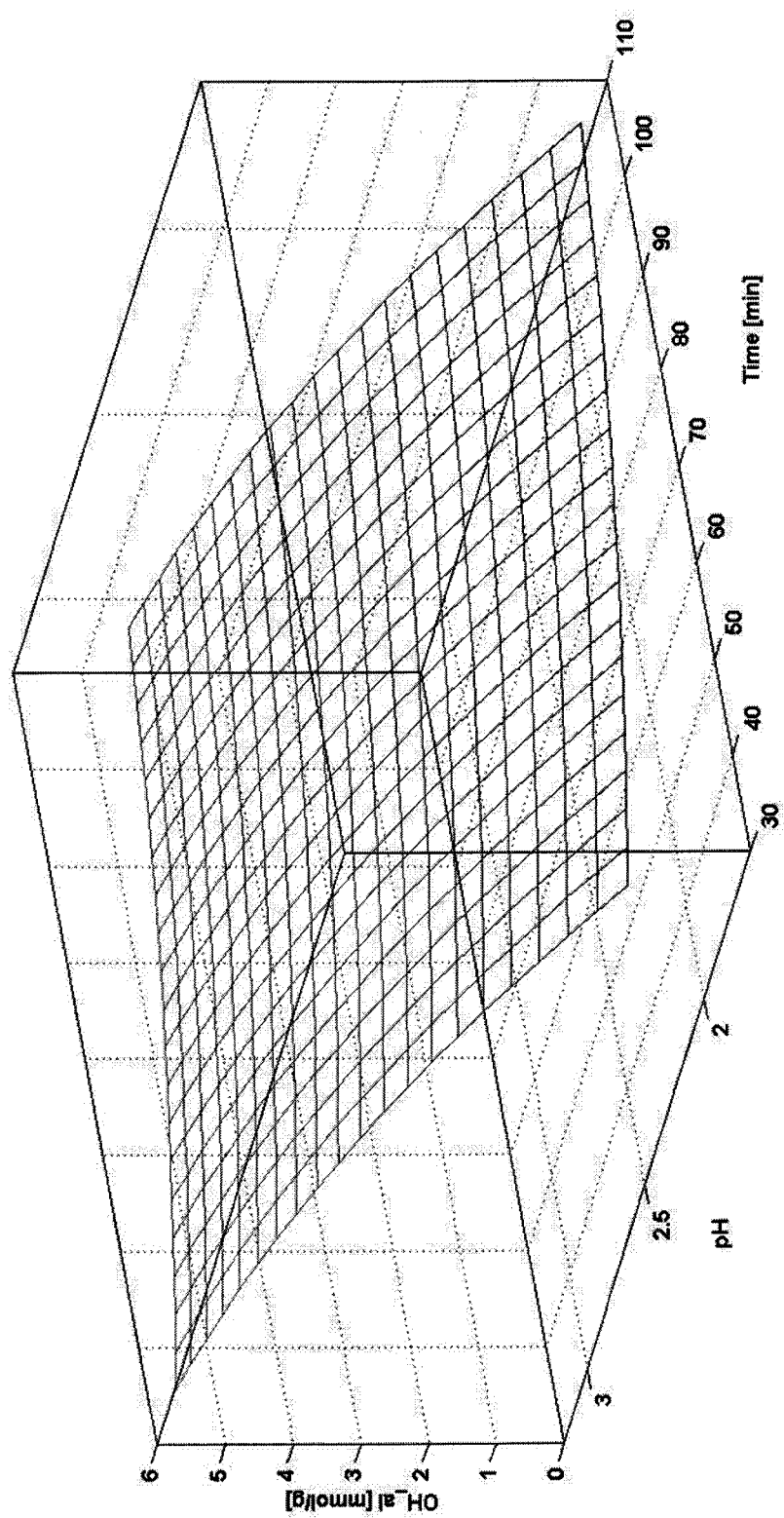
FIG. 5 is a chart showing aliphatic hydroxyl contents of lignin derivatives of the present disclosure recovered from radiata pine as a function of acidification of the organic solvent [pH] and pulping time [Time] at constant organic solvent concentration of 60.5% (w/w) and pulping temperature of 183° C.

FIG. 5 shows aliphatic hydroxyl contents of lignin derivatives recovered from radiata pine as a function of acidification of the organic solvent [pH] and pulping time [Time] at constant organic solvent concentration of 60.5% (w/w) and pulping temperature of 183° C., and shows process conditions suitable for producing lignin derivatives of the present disclosures having either decreased or increased aliphatic hydroxyl contents.

Southeastern USA Loblolly Pine:

In reference to the operating conditions for the twenty seven preliminary organosolv pulping runs with subsamples of loblolly pine shown in Table 4(c), the intervals used for model generation were: (a) pH=[1.49, 3.52]; (b) Ethanol concentration in the organic solvent (% w/w)=[37.8, 90.2]; (c) pulping time duration (min)=[27.9, 121]; and (d) pulping temperature (° C.)=[150.3, 218.9].

The equation derived from the aliphatic hydroxyl data shown in Table 4(c) for selection of two or more operating conditions for production of lignin derivatives having an aliphatic hydroxyl content of about 1.22 mmol/g to about 4.83 mmol/g, is:

$$19.7852-11.2196*pH-0.153691*Time-$$
$$2.39789*pH*pH+0.0880747*pH*Time+$$
$$0.102069*pH*Temperature+$$
$$0.0203294*pH*Ethanol-$$
$$0.000537328*Time*Time-$$
$$0.000706365*Temperature*Temperature-$$
$$0.000470555*Ethanol*Ethanol \quad \text{EQ 6}$$

Figure 6:
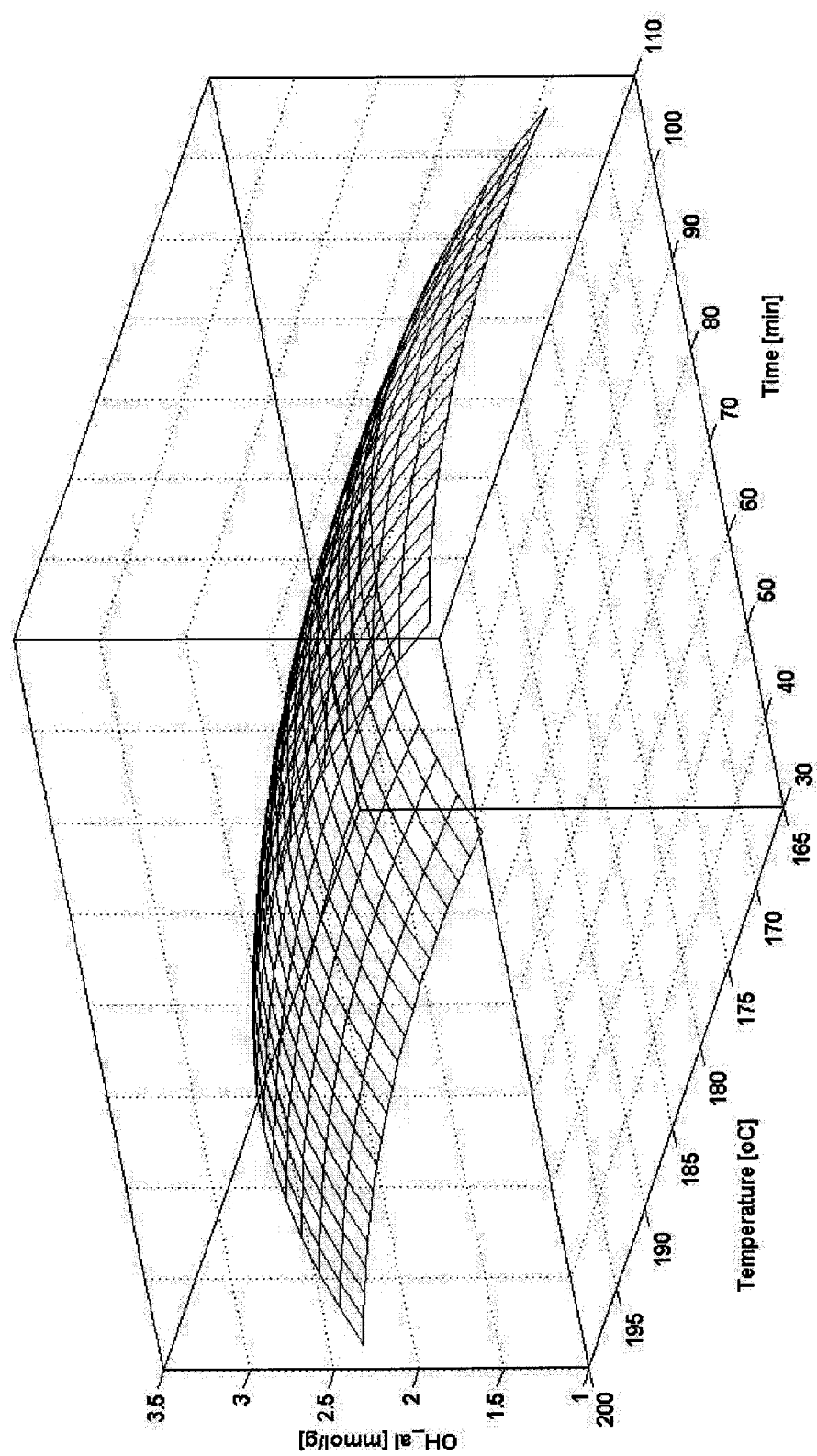
FIG. 6 is a chart showing aliphatic hydroxyl contents of lignin derivatives of the present disclosure recovered from loblolly pine as a function of pulping time [Time] and pulping temperature [Temperature, ° C.] at constant pH of the pulping liquor of 2.43 and organic solvent concentration of 62% w/w ethanol.

FIG. 6 is a chart showing aliphatic hydroxyl contents of lignin derivatives of the present disclosure recovered from loblolly pine as a function of pulping time [Time] and pulping temperature [Temperature, ° C.] at constant pH of the pulping liquor of 2.43 and organic solvent concentration of 62% w/w ethanol, and process conditions suitable for producing lignin derivatives of the present disclosures having either decreased or increased aliphatic hydroxyl contents;

EXAMPLE 6

Predictive Equations for Selective Recovery of Lignin Derivatives Having Targeted Aliphatic Hydroxyl Contents, from Organosolv Pulping of Annual Fibre Biomass Feedstocks Alberta Wheat Straw:

In reference to the operating conditions for the twenty seven preliminary organosolv pulping runs with subsamples of wheat straw shown in Table 5(a), the intervals used for model generation were: (a) pH=[1.76, 2.86]; (b) Ethanol concentration in the organic solvent (% w/w)=[36,72]; (c) pulping time duration (min)=[27, 106]; and (d) pulping temperature (° C.)=[162, 195].

The equation derived from the aliphatic hydroxyl data shown in Table 5(a) for selection of two or more operating conditions for production of lignin derivatives having an aliphatic hydroxyl content of about 1.83 mmol/g to about 3.95 mmol/g, is:

$$-20.3795+5.44647*pH+0.286802*Temperature-\\0.218004*Ethanol-1.35259*pH*pH+\\0.00661225*pH*Time+0.0170796*pH*Ethanol-\\0.000166011*Time*Time+\\0.0000958888*Time*Ethanol-\\0.00103049*Temperature*Temperature+\\0.000921376*Temperature*Ethanol \quad\quad EQ\ 7$$

Figure 7:
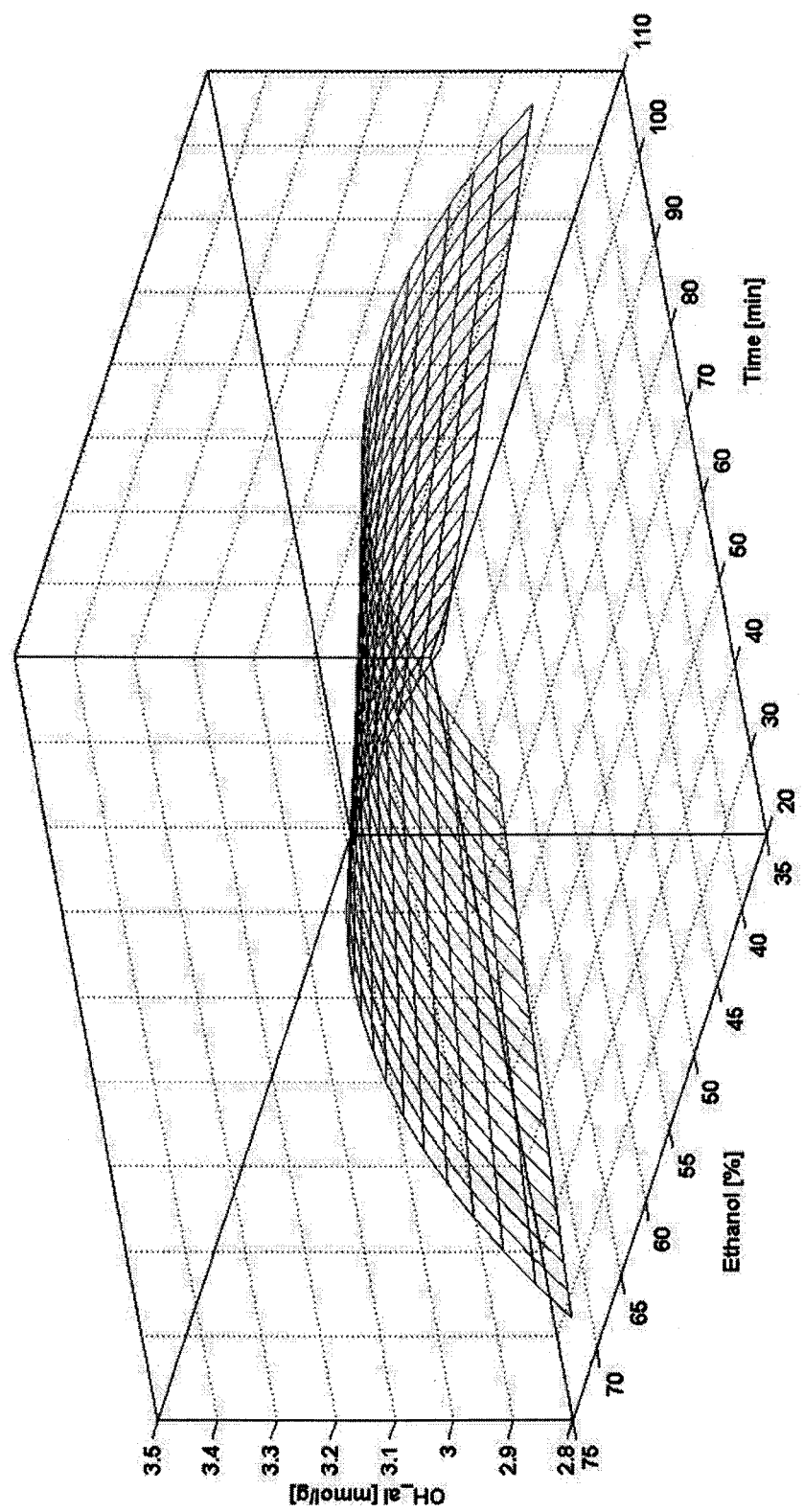
FIG. 7 is a chart showing aliphatic hydroxyl contents of lignin derivatives of the present disclosure recovered from wheat straw as a function of organic solvent concentration [Ethanol] and pulping time [Time] at constant pulping temperature of 185.5° C. and organic solvent acidified to a pH of 2.2.

FIG. 7 shows aliphatic hydroxyl contents of lignin derivatives recovered from wheat straw as a function of organic solvent concentration [Ethanol] and pulping time [Time] at constant pulping temperature of 185.5° C. and organic solvent acidified to a pH of 2.2, and shows process conditions suitable for producing lignin derivatives of the present disclosures that have either decreased or increased aliphatic hydroxyl contents.

Brazilian Sugarcane Bagasse:

In reference to the operating conditions for the twenty six preliminary organosolv pulping runs with subsamples of sugarcane bagasse shown in Table 5(b), the intervals used for model generation were: (a) pH=[2.01, 3.26]; (b) Ethanol concentration in the organic solvent (% w/w)=[37,73]; (c) pulping time duration (min)=[23,98]; and (d) pulping temperature (° C.)=[161, 197].

The equation derived from the aliphatic hydroxyl data shown in Table 5(b) for selection of two or more operating conditions for production of lignin derivatives having an aliphatic hydroxyl content of about 1.55 mmol/g to about 3.84 mmol/g, is:

$$37.6682-0.119057*Time-0.309507*Temperature-\\0.126539*Ethanol+0.0255398*pH*Ethanol+\\0.000640605*Time*Temperature+\\0.000691701*Temperature*Temperature+\\0.000531287*Ethanol*Ethanol \quad\quad EQ\ 8$$

Figure 8:
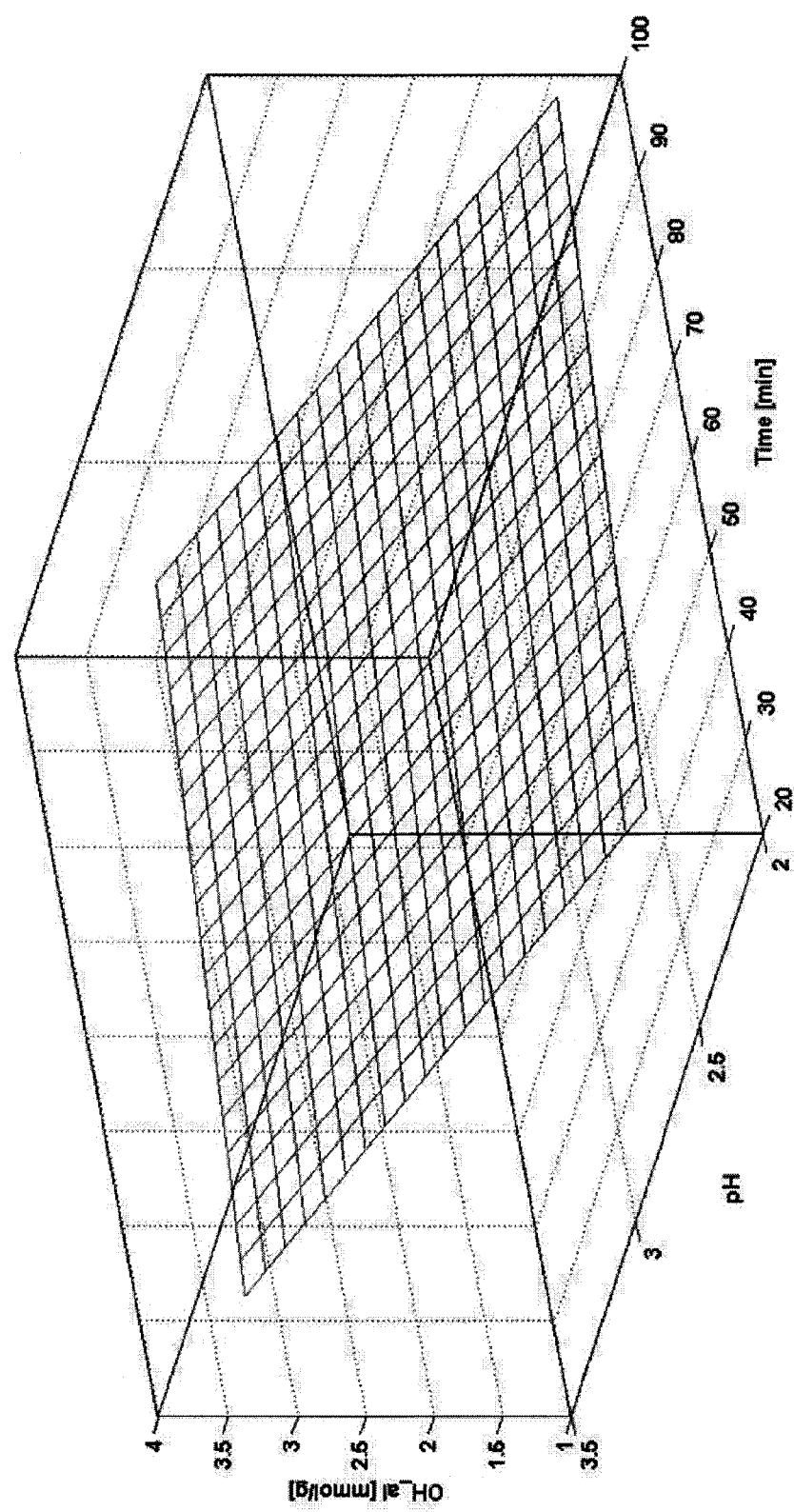
FIG. 8 is a chart showing aliphatic hydroxyl contents of lignin derivatives of the present disclosure recovered from bagasse as a function of acidification of the organic solvent [pH] and pulping time [Time] at constant organic solvent concentration of 55% (w/w) and pulping temperature of 179° C.

FIG. 8 shows aliphatic hydroxyl contents of lignin derivatives recovered from bagasse as a function of acidification of the organic solvent [pH] and pulping time [Time] at constant organic solvent concentration of 55% (w/w) and pulping temperature of 179° C., and shows process conditions suitable for producing lignin derivatives of the present disclosures having either decreased or increased aliphatic hydroxyl contents.

European Corn Cobs:

In reference to the operating conditions for the twenty seven preliminary organosolv pulping runs with subsamples of corn cob biomass shown in Table 5(c), the intervals used for model generation were: (a) pH=[1.76, 2.81]; (b) Ethanol concentration in the organic solvent (% w/w)=[35, 72]; (c) pulping time duration (min)=[27, 106]; and (d) pulping temperature (° C.)=[162, 192].

The equation derived from the aliphatic hydroxyl data shown in Table 5(c) for selection of two or more operating conditions for production of lignin derivatives having an aliphatic hydroxyl content of about 1.42 mmol/g to about 5.05 mmol/g, is:

$$-44.7775+0.544455*Temperature-2.22722*pH*pH+\\0.0637232*pH*Temperature-\\0.000080298*Time*Ethanol-\\0.00200084*Temperature*Temperature \quad\quad EQ\ 9$$

Figure 9:
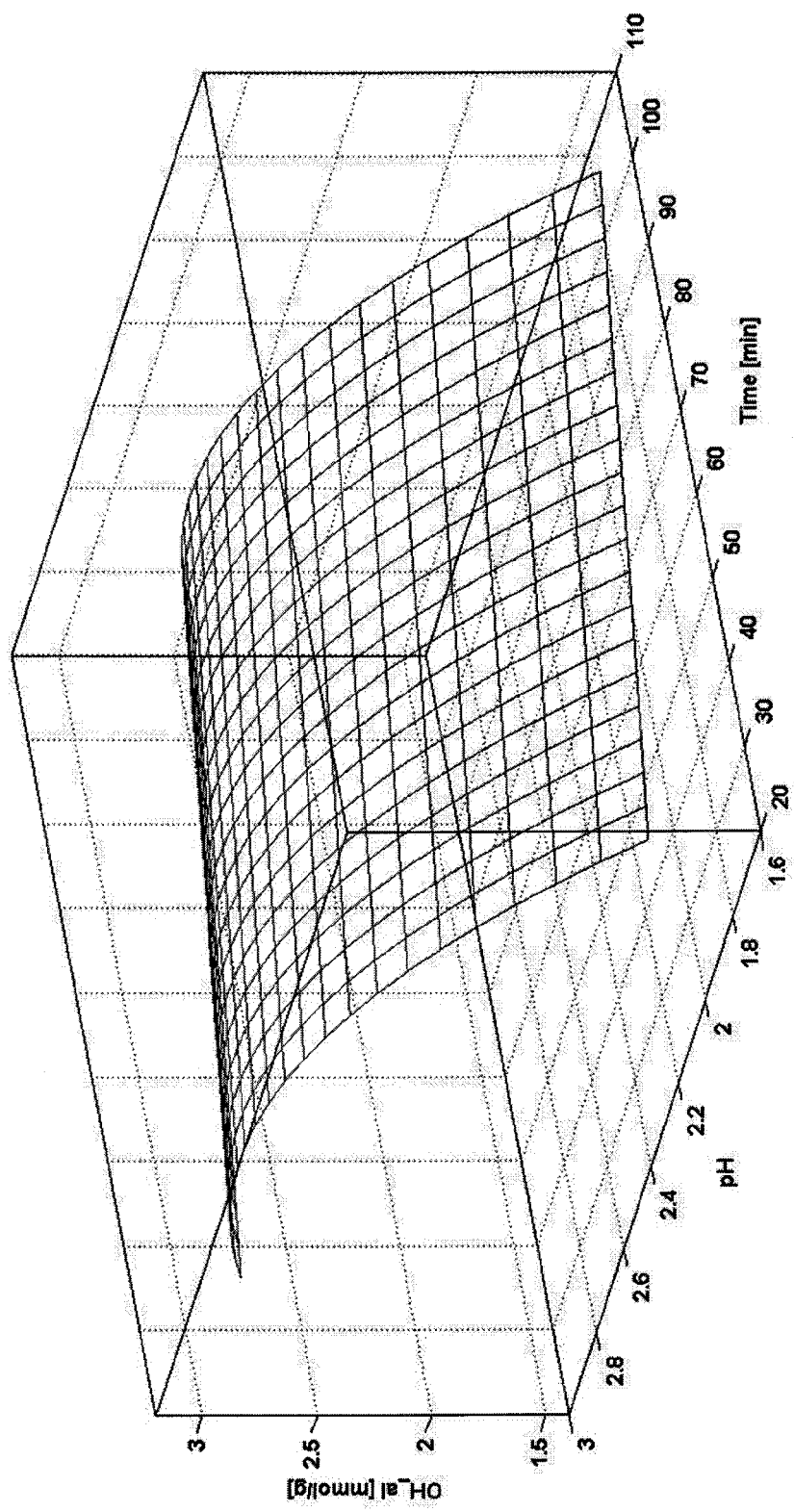
FIG. 9 is a chart showing aliphatic hydroxyl contents of lignin derivatives of the present disclosure recovered from corn cobs as a function of acidification of the organic solvent [pH] and pulping time [Time] at constant organic solvent concentration of 53.5% (w/w) and pulping temperature of 177° C.

FIG. 9 shows aliphatic hydroxyl contents of lignin derivatives recovered from corn cobs as a function of acidification of the organic solvent [pH] and pulping time [Time] at constant organic solvent concentration of 53.5% (w/w) and pulping temperature of 177° C., and shows process conditions suitable for producing lignin derivatives of the present disclosures having either decreased or increased aliphatic hydroxyl contents.

The invention claimed is:

1. A process for recovering a lignin derivative from a hardwood feedstock, the lignin derivative having an aliphatic hydroxyl content of 2.35 mmol/g or less, the process comprising:

pulping the feedstock with a selected organic solvent (ETHANOL) supplemented with a selected acid catalyst (pH) for a selected period of time (TIME) at a selected temperature (TEMPERATURE) to produce a cellulosic solids fraction and an extractives liquid fraction;

separating the cellulosic solids fraction from the extractives liquid fraction; and recovering the lignin derivative from an extractives liquid fraction, wherein the hardwood feedstock is an *Acacia* spp. and the parameters ETHANOL, pH, TIME, and TEMPERATURE are selected to satisfy the equation:

$$44.4758-17.3944*pH-0.342106*Temperature+\\0.373582*Ethanol-0.0133583*pH*Time+\\0.124198*pH*Temperature+\\0.000205204*Time*Time-\\0.00333743*Ethanol*Ethanol \leq 2.35.$$

2. A process according to claim 1, wherein the *Acacia* spp. is an *A. albida, A. cavenia, A. dealbata, A. decurrens, A. framesiana, A. meamsii, A. Melanoxylon, A. nilotica, A. penninervis, A. pycnatha, A. saligna*, and combinations thereof.

3. A process according to claim 2, wherein the recovered lignin derivative falls within the graphical representation of FIG. 2.

4. A process for recovering a lignin derivative from a hardwood feedstock, the lignin derivative having an aliphatic hydroxyl content of 2.35 mmol/g or less, the process comprising:

pulping the feedstock with a selected organic solvent (ETHANOL) supplemented with a selected acid catalyst (pH) for a selected period of time (TIME) at a selected temperature (TEMPERATURE) to produce a cellulosic solids fraction and an extractives liquid fraction;

separating the cellulosic solids fraction from the extractives liquid fraction; and recovering the lignin derivative from an extractives liquid fraction, wherein the hardwood feedstock is an *Eucalyptus* spp. and the parameters ETHANOL, pH, TIME, and TEMPERATURE are selected to satisfy the equation:

$$42.1508 + 4.21822*pH - 0.5579848 \text{Temperature} + 0.352034*\text{Ethanol} - 0.0197431*pH*\text{Time} + 0.000758397*\text{Time}*\text{Ethanol} + 0.00148659*\text{Temperature}*\text{Temperature} - 0.000837671*\text{Temperature}*\text{Ethanol} - 0.00251297*\text{Ethanol}*\text{Ethanol} \leqq 2.35.$$

5. A process according to claim 4, wherein the *Eucalyptus* spp. is an *E. astrigens, e. clivicola, E. dielsii, E. forrestiana, E. gardneri, E. globulus, E. nitans, E. occidentalis, E. ornata, E. salubris, E. spathulata*, and combinations thereof.

6. A process according to claim 5, wherein the recovered lignin derivative falls within the graphical representation of FIG. 3.

* * * * *